United States Patent [19]
Hayashi

[11] Patent Number: 5,828,886
[45] Date of Patent: *Oct. 27, 1998

[54] COMPILING APPARATUS AND METHOD FOR PROMOTING AN OPTIMIZATION EFFECT OF A PROGRAM

[75] Inventor: Masakazu Hayashi, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 393,561

[22] Filed: Feb. 23, 1995

[30] Foreign Application Priority Data

Feb. 23, 1994 [JP] Japan .................................. 06-025171

[51] Int. Cl.$^6$ ....................................................... G06F 9/45
[52] U.S. Cl. ........................................... 395/709; 395/707
[58] Field of Search ..................................... 395/700, 705, 395/707, 709

[56] References Cited

U.S. PATENT DOCUMENTS

| | | | |
|---|---|---|---|
| 4,931,928 | 6/1990 | Greenfeld | 395/708 |
| 5,021,945 | 6/1991 | Morrison et al. | 395/375 |
| 5,261,062 | 11/1993 | Sato | 395/705 |
| 5,404,551 | 4/1995 | Katsuno | 395/800 |
| 5,428,793 | 6/1995 | Odnert et al. | 395/709 |
| 5,497,499 | 3/1996 | Garg et al. | 395/393 |
| 5,557,793 | 9/1996 | Senter et al. | 395/614 |

FOREIGN PATENT DOCUMENTS

| | | | |
|---|---|---|---|
| 2-257224 | 10/1990 | Japan | G06F 8/45 |
| 5-265769 | 10/1993 | Japan | G06F 9/45 |
| 5265769 | 10/1993 | Japan | G06F 9/45 |

OTHER PUBLICATIONS

Vias et al., "Snooper," Ver 3, ref. man., Vias and Assoc., pp. 26–31, Jan. 1989.

Johnson, Mike "Superscalar Microprocessor Design" Prentice–Hall pp. 9–30, 103–146 Jan. 1991.

Vias et al. "SNOOPER" Version 3 reference manual Vias and Associates pp. 26–31, Jan. 1989.

*Primary Examiner*—Emanuel Todd Voeltz
*Assistant Examiner*—Peter J. Corcoran, III
*Attorney, Agent, or Firm*—Staas & Halsey

[57] ABSTRACT

A compiling apparatus and method in which instructions are scheduled for an efficient parallel process with a register allotting process and an instruction scheduling process performed independently of each other. An instruction scheduling unit collects information indicating the range of available registers, and renames registers by replacing the register numbers used by the instructions with other register numbers according to the collected register information and the analysis of definition/reference instruction dependency. The instructions are scheduled after the registers have been renamed.

13 Claims, 22 Drawing Sheets

INSTRUCTION STRING PRIOR TO RENAMING
① add  gr1,  gr2,  gr3
② add  gr3,  gr4,  gr5
③ sub  gr6,  gr7,  gr3
④ sub  gr8,  gr3,  gr9
FIG. 2A
DEPENDENCY
FIG. 2B
INSTRUCTION STRING AFTER RENAMING
① add  gr1,  gr2,  gr3
② add  gr3,  gr4,  gr5
③ sub  gr6,  gr7,  gr10
④ sub  gr8,  gr10, gr9
FIG. 2C
DEPENDENCY
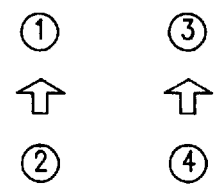
FIG. 2D

| NUMBER OF REGISTERS | GENERAL-PURPOSE REGISTER | 32 (0-31) |
|---|---|---|
| | FLOATING POINT REGISTER | 32 (0-31) |
| INSTRUCTION SET | add | INST_ADD |
| | addl | INST_ADD_L |
| | brc | INST_BRC |
| | ⋮ | ⋮ |
| | fadd | INST_FADD |
| | ⋮ | ⋮ |
| INSTRUCTION LATENCY | add | 0, 1, 1, 1 |
| | addl | 0, 1, 1, 1 |
| | brc | 0, 1, 1, 1 |
| | ⋮ | ⋮ |
| | fadd | 0, 4, 4, 4 |
| | ⋮ | ⋮ |

FIG. 3

```
                FOR ARCHITECTURE
    char    get UNIT [ ]= {
    /* LABEL  */            UNIT_NONE,
    /* PSEUDO */            UNIT_NONE,
    /* add    */            UNIT_INT,
    /* add1   */            UNIT_INT,
    /* fadd   */            UNIT_FLOAT,
    /* fsub   */            UNIT_FLOAT,
    /* fmul   */            UNIT_FLOAT,
    /* load   */            UNIT_MEM,
    /* store  */            UNIT_MEM,
    }
```

FIG. 19A

```
                FOR ARCHITECTURE
    char    get UNIT [ ]= {
    /* LABEL  */            UNI_NONE,
    /* PSEUDO */            UNIT_NONE,
    /* add    */            UNIT_INT,
    /* add1   */            UNIT_INT,
    /* fadd   */            UNIT_FADD,
    /* fsub   */            UNIT_FADD,
    /* fmul   */            UNIT_FMUL,
    /* load   */            UNIT_MEM,
    /* store  */            UNIT_MEM,
    }
```

FIG. 19B

```
    #define UNIT_NONE   (0)
    #define UNIT_MEM    (1)
    #define UNIT_INT    (2)
    #define UNIT_FMUL   (3)
    #define UNIT_FADD   (4)

#define UNIT_FLOAT  (3)
```

FIG. 19C

COMPILING APPARATUS AND METHOD FOR PROMOTING AN OPTIMIZATION EFFECT OF A PROGRAM

BACKGROUND OF THE INVENTION

1. Field of the Invention

The present invention relates to a compiling apparatus and method for promoting an optimization effect of a program operated by computers such as super scalar and VLIW architecture.

With an increasing demand for high-speed computer systems, a number of processors for simultaneously executing a plurality of instructions in a single cycle and machines which can perform vector operations have been developed. Requested also is optimum instruction scheduling for a compiler.

The instruction scheduling is one of the optimization methods. By rearranging the instructions, a pipeline process which can save time or resources (registers, operators, etc.) can be effectively utilized. It is a very effective method for a compiler having the function of performing parallel processes.

2. Description of the Prior Art

A compiler, which compiles a source program written in a high-level language into an object program or an assembler program composed of instruction strings written in machine language, first analyzes a sentence and meanings in its front-end unit, optimizes the program by deleting redundant instructions in its optimizing unit, allocates registers based on the analysis and optimization results, and outputs codes of instructions written in machine language. Particularly, a compiler of a processor having the function of performing a parallel processing is designed to schedule instructions for efficient parallel processing by rearranging the instructions before outputting the codes.

Instruction scheduling and register allotting are important factors of optimization. There are the following problems in determining the execution order between instruction scheduling and register allotting.

1. If instructions are scheduled before registers are allotted, the range of variable/temporary registers is enlarged and available registers are short. Thus, a spill instruction or register transfer instruction may be generated. Since a spill instruction requires a longer execution time using memory than other operations, it may result in deteriorated system performance. A spill instruction refers to a code generated when there are no registers to be allotted to data. Normally, a spill instruction comprises two instructions, that is, a store instruction to save in memory the data stored in a register to reserve the register and a load instruction to fetch the saved data to the register.

2. When instructions are scheduled after registers are allotted, allotting the registers may reserve the same register for different pieces of data to be processed normally in parallel, thereby disturbing the parallel process of the data.

That is, when the instruction schedule is performed first, available registers may be short. On the other hand, if registers are allotted first, then the registers may be allotted in the register allotting process such that the smallest possible number of registers can be allotted, thereby preventing the parallel process from being performed successfully.

The above described problems exist conventionally. Since a register allotting process and instruction scheduling are indispensable processes for an optimization compiler, the above described problems have been solved by the following methods in the conventional technology.

1. If instructions have been scheduled before registers are allotted, the instructions are rescheduled after the registers are allotted, and generated spill codes are properly scheduled.

2. If instructions are scheduled after registers have been allotted, then cyclically allotting the registers prevents to some extent the parallel process from being disturbed.

However, the following problems remain in the conventional technology.

1. If instructions are scheduled before registers are allotted;
   (1) Two scheduling phases should be followed to schedule a (spill instruction. The effect of scheduling through compilation is not as distinct as the user can expect.
   (2) A spill instruction generated by the register allotting process cannot be deleted.

2. If instructions are scheduled after registers have been allotted;
   (1) Cyclically allotting the registers recognizes only the parallel arrangement of data, but not intrinsic parallelism of the data including machine-dependency such as the parallelism of operating units.
   (2) Some cyclical register allotting methods clearly separate source (reference) registers from destination (definition) registers. In these methods, registers may become short during the operations.

SUMMARY OF THE INVENTION

First, the present invention aims at solving the problem of the process order between allotting registers and scheduling instructions by renaming the registers during the instruction scheduling process so that various optimization requests for compilers can be fully satisfied.

Second, the present invention aims at determining the priority level of each piece of renamed data according to architecture information.

According to a third object of the present invention, if register allotting clearly separates source (reference) registers from destination (definition) registers and therefore available registers become short, then the source and destination registers are renamed to be equivalent to one another such that the parallelism of data is retained and the optimal registers can be used.

Fourth, the present invention aims at separately performing an instruction scheduling process and a register allotting process by removing the necessity of recognizing the instruction schedule and parallelism of hardware in the register allotting process.

A feature of the present invention resides in a compiling apparatus which schedules instructions after allotting registers to generate codes for an efficient parallel process of the instructions, said apparatus having a front-end unit for receiving and analyzing a source program, an optimization unit for optimizing an analysis result, a register allotting unit for allotting the registers to data to be processed as the analysis result, an instruction scheduling unit for rearranging the instructions, and a code output unit for outputting an object program, comprising in the instruction scheduling unit, a register information collecting unit for collecting information indicating a range of available registers, an instruction dependency analyzing unit for analyzing dependency of the instructions in definition and reference, a register renaming unit for renaming the registers by replacing register numbers used for the instructions with other register numbers according to collected register information and an instruction dependency analysis result, and an instruction schedule process unit for rearranging the instructions according to a result of renaming the registers.

BRIEF DESCRIPTION OF THE DRAWINGS

FIGS. 2(A)–2(D) show the renaming process according to the present invention:

FIG. 3 shows an example of the architecture information table;

FIGS. 19(A)–19(C) show the register renaming process depending on the architecture;

DESCRIPTION OF THE PREFERRED EMBODIMENTS

Figure 1:
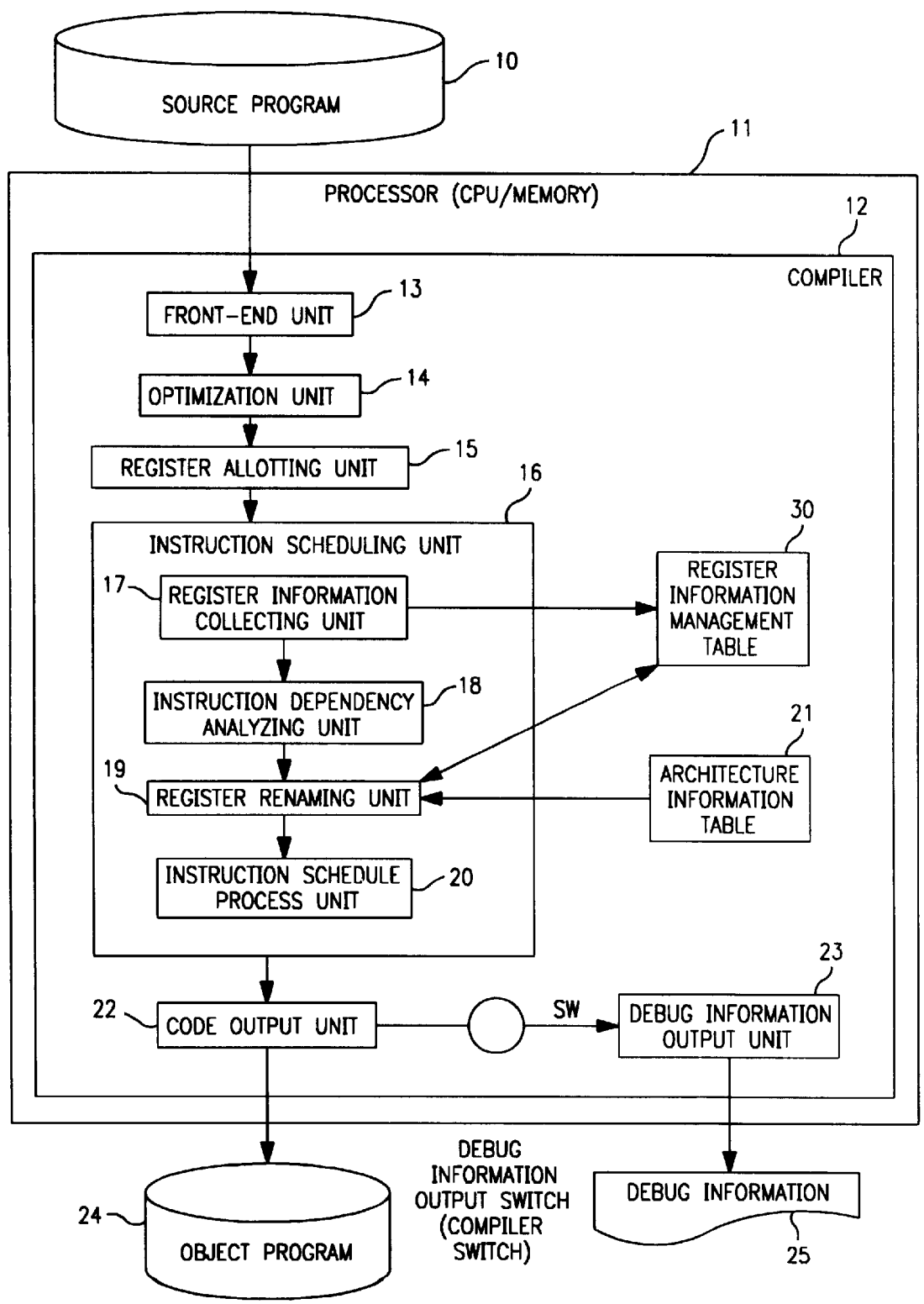
FIG. 1 shows an example of the configuration according to the present invention.

FIG. 1 shows an example of the configuration of the present invention.

In FIG. 1, 10 is a source program to be compiled; a processor 11 comprises a CPU, memory, etc.; 12 is a compiler; a front-end unit 13 generates an intermediate text from the source program 10 through sentence and meaning analysis; an optimization unit 14 deletes redundant portions of the intermediate text; a register allotting unit 15 allots registers according to optimization results; an instruction scheduling unit 16 rearranges instructions so that a parallel process can be efficiently performed; a register information collecting unit 17 collects register use information; an instruction dependency analyzing unit 18 analyzes the independency in defining and referring to instructions; a register renaming unit 19 replaces a register number in an instruction with another register number; an instruction schedule process unit 20 schedules instructions according to register renaming results; an architecture information table 21 stores architecture information about a computer in which a program to be compiled is executed; a code output unit 22 outputs codes of, for example, instruction strings written in machine language; a debug information output unit 23 outputs debug information; an object program 24 is obtained by compiling a program; debug information 25 are output by the debug information output unit 23; and a register information management table 30 stores information indicating the use state of registers.

The present invention closely relates to the instruction scheduling unit 16 of the compiler 12. Other units are similar to those of the prior art technology. The instruction scheduling unit 16 comprises the register information collecting unit 17 before the instruction dependency analyzing unit 18, and replaces a register number through the register renaming unit to remove the anti-dependency and output dependency and realize instruction scheduling with improved parallel processes for instructions. The register renaming unit 19 uses the architecture information table 21 to change the renaming priority depending on computer architecture.

According to the present invention, the register information collecting unit 17 calculates the use range of registers according to instruction strings assigned registers. When the instruction dependency analyzing unit 18 analyzes an instruction, the register renaming unit 19 renames registers.

FIGS. 2A through 2D shows the register renaming process.

Assumed are, for example, instruction strings 1 through 4 as shown in FIG. 2A. In instructions 1 through 4, add indicates an add instruction, and sub indicates a subtraction instruction. gr1 through gr10 indicate general purpose registers 1 through 10. For example, instruction 1 is to add values of gr1 and gr2 and assign the sum to gr3. Instruction 3 is to subtract a value of gr7 from that of gr6 and assign the difference to gr3.

According to the dependency of the instruction strings shown in FIG. 2A, instruction 1 defines gr3; instruction 2 refers to gr3; instruction 3 defines gr3, and instruction 4 refers to gr3. Thus, the dependency of the instructions are as shown in FIG. 2B, and the instruction is not allowed to be rearranged in an execution order.

If gr3 in instructions 3 and 4 is renamed into gr10 indicating another general-purpose register as shown in FIG. 2C, then the dependency between instructions 1 and 2 and instructions 3 and 4 is cleared as shown in FIG. 2D. This indicates that instructions 1 and 2 can be executed in parallel with the subsequent instructions 3 and 4.

According to the present invention, the above described register renaming processes improve the efficiency in parallel processes and the performance of the generated object program 24.

FIG. 3 shows an example of the architecture information table used in the embodiment of the present invention.

According to the present embodiment, the architecture information table 21 shown in FIG. 3 is used so that the compiler 12 shown in FIG. 2 properly corresponds to various types of architecture.

Entered in the architecture information table 21 is architecture information such as the number of available registers, instruction sets, instruction latency indicating the instruction delay, etc., for the computer in which a program to be compiled is executed. In the example shown in FIG. 3, the number of registers is 32 for both general-purpose registers and floating point registers. Set in the instruction set column is information for use in converting instructions into standardized internal instructions, for example, an add instruction into an internal operation code $INST_{13}ADD$, an addl instruction into an internal operation code $INST_{13}ADD\_L$, etc. Entered in the instruction latency column is instruction delay in the four cases where two instructions are not dependent on each other; two instructions are definition-reference related; two instructions are reference-definition related; and two instructions are definition-definition related. In this example, the delay of an add instruction and an addl instruction is represented by 1, and the delay of a dependent fadd instruction (floating point add instruction) is represented by 4. Other information about the number and types of operating units, etc. is entered in the architecture information table 21.

Particularly, register renaming can be effectively realized depending on computer architecture by referring to the architecture information table 21 through the register renaming unit 19 shown in FIG. 1.

Figure 4:
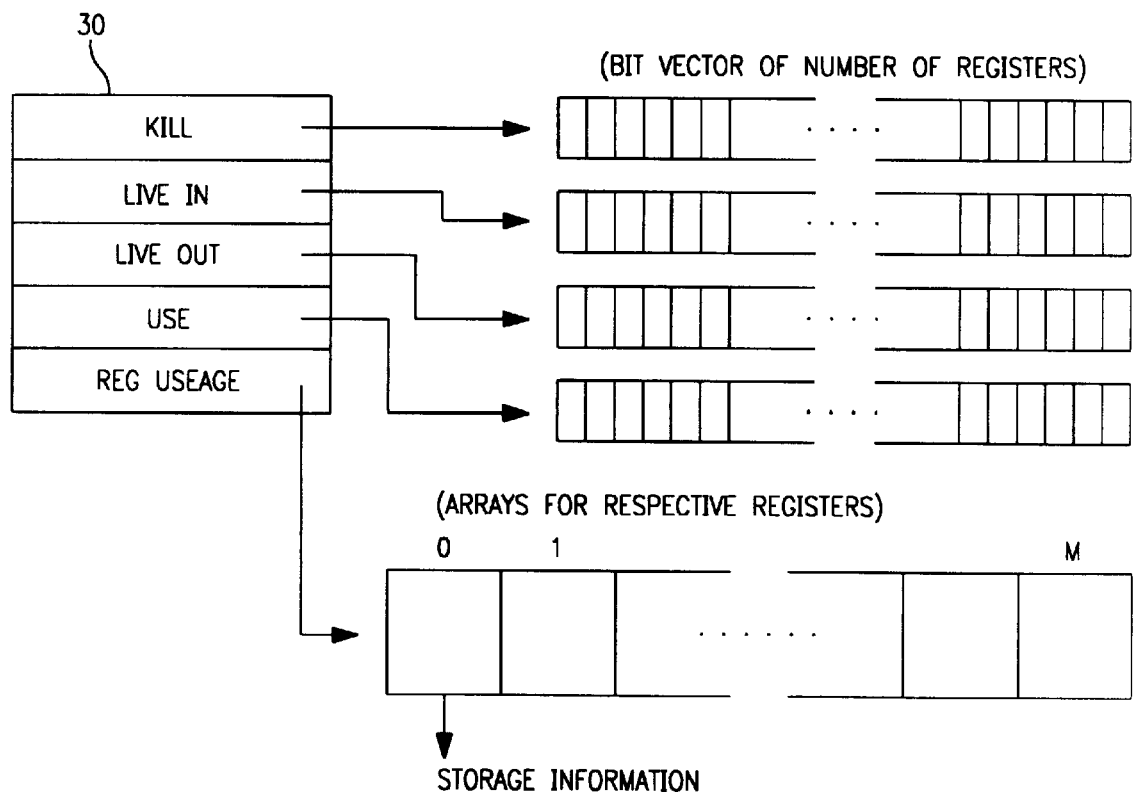
FIG. 4 shows the configuration of the register information management table.

Described before explaining the practical operations performed according to the present embodiments is; the configuration of the register information management table 30 generated by the register information collecting unit 17. FIG. 4 shows the configuration of the register information management table 30.

The register information management table 30 stores the results of the analysis for the available range of the registers in basic block units. A basic block refers to a unit comprising serial intermediate text strings (or instruction strings) without branches, stops or interruptions after control is passed to the leading intermediate text (or instruction).

The fields from Kill to Use on the register information management table 30 point to bit vectors of the number of respective registers. Since the number of vectors is a total of 64 in the present embodiments, each bit vector is formed of 64 bits. The bit value 1 or 0 indicates the setting of each register for the field.

Kill indicates which register is not required in the basic block. Live in indicates a register received alive in a basic block. Live out indicates a register exiting alive from a basic block. Use indicates which register is used in the basic block. The Reg Usage field points to the array of the number of registers, and the components of each array are data stored in respective registers. The data is, for example, position information on intermediate text represented by a value set in a register, information indicating whether the value is a variable or constant, etc.

Figure 5:
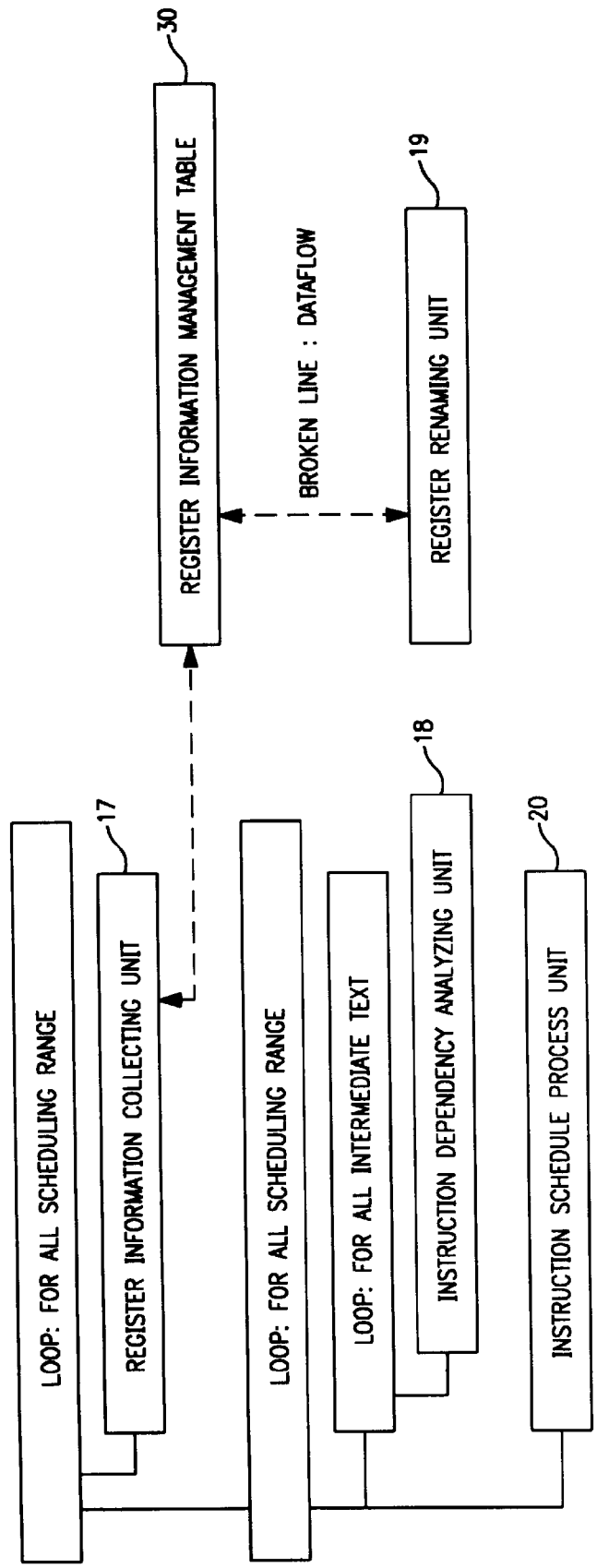
FIG. 5 shows the processes performed by the instruction scheduling unit according to a first embodiment of the present invention.

FIG. 5 shows the configuration of the process performed by the instruction scheduling unit 16 according to a first embodiment of the present invention.

According to the first embodiment shown in FIG. 5, the register information collecting unit 17 collects register information and the register information management table 30 is generated for the entire range of scheduling. Then, all intermediate text in the range of scheduling is processed by the instruction dependency analyzing unit 18 and the register renaming unit 19, and the result is processed by the instruction schedule process unit 20.

Described in detail below is the process performed by each unit.

[Process of Register Information Collecting Unit 17]

The register information collecting unit 17 analyzes the range of available registers used for functions to be compiled. According to the first embodiment, the range of scheduling is a basic unit, but is not necessarily a basic unit. The algorithm of analyzing the range of available registers can be based on a well-known data flow analyzing technology (refer to A.V. Aho et al. Compiler—Principle, Technology, and Tools, Chapter 10, published by Science).

The register information collecting unit 17 informs the user of alive/dead register numbers. The information can be stored in the data structure as shown in FIG. 4, and passed to the subsequent phases. A compiler switch can also be designed to output the information to the debug information of the assembler and the compiler.

Alive/dead registers are defined as follows. If data is effective at a given time (for example, at the end of the basic block, at the end of the range of scheduling, and as an intermediate text) and afterwards, then the data is referred to as being alive. Alive data can be referred to. On the other hand, if data is not effective, that is, cannot be referred to, at and after a given time, then the data is dead.

Figure 6:
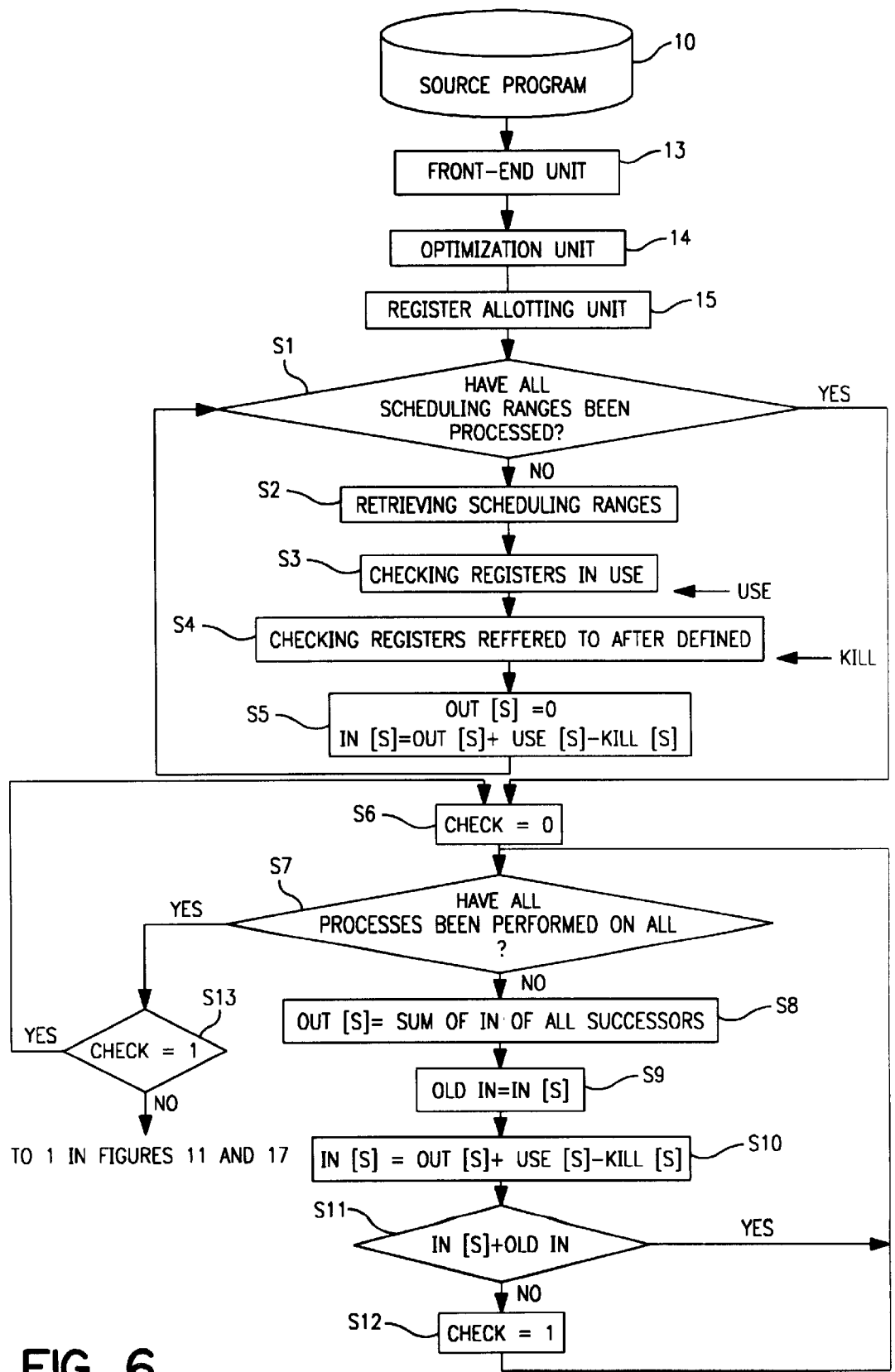
FIG. 6 is a detailed flowchart showing the register information collecting process.

Among the processes of the instruction scheduling unit 16 shown in FIG. 5, the operation of the process performed by the register information collecting unit 17 is described by referring to FIG. 6. FIG. 6 is a flowchart showing in detail the process performed by the register information collecting unit 17 by referring to FIG. 1. In FIG. 6, the register information collecting unit 17 performs its operation in response to the input of the source program 10 after the process 13 performed by the front-end unit, the process 14 performed by the optimization unit, and the process 15 performed by the register allotting unit as in FIG. 1.

FIG. 6 shows in detail the process of the register information collecting with step numbers assigned. First, in step S1, it is determined whether or not the processes in steps S2 through S5 have been completed for all scheduling ranges. If it is determined that the processes have not been completed, then one scheduling range is retrieved in step S2, a register being used in the scheduling range is checked in step S3, and the register being used in the scheduling range is stored as corresponding to USE explained by :referring to FIG. 4.

The register defined in the scheduling range and then referred to is checked in step S4, and it is stored as a register for KILL shown in FIG. 4. In step S5, a set OUT[S] is an empty set and the set IN[S] of registers alive in the scheduling range is calculated by the following equation.

$$IN[S]=OUT[S]+USE[S]-KILL[S]$$

If the process for one scheduling range S has been completed, then control returns to step S1 again, and the processes in steps S2 through S5 continue for all scheduling ranges. Thus, the set IN[S] is initialized for all scheduling ranges.

If it is determined that the processes in steps S2 through S5 have been completed for all scheduling ranges in step 1, then it is determined whether or not the processes in steps S8 through S12 have been completed for all scheduling ranges in step S7 after a check flag (CHECKF) is set to 0 in step S6. If not, the set OUT[S] of registers alive when the scheduling range is quit is obtained as all successors, that is, a sum of the set IN for the next jump to scheduling range from the present scheduling range in step S8.

Then, in step S9, the present set IN[S] is defined as a set OLD IN and then the set IN[S] is calculated again in step 10 using the similar equation indicated in step S5.

In step S11, it is determined whether or not the two sets obtained in steps S9 and S10 match each other. If not, the value of the check flag is set to 1 in step S12. If yes, no process is performed. Then, control returns to step S7, and the processes are performed for the next scheduling range.

If it is determined in step S7 that the processes in steps S8 through S12 have been completed for all scheduling ranges, then it is determined whether or not the value of the check flag is 1 in step S13. If yes, control returns to step S6 and the value of the check flag is set to 0. Then, the processes in and after step S7 are repeated. If it is determined that the check flag does not indicate 1 in step S13, then control is passed to the process 18 to be performed by the instruction dependency analyzing unit as shown in FIG. 1.

Described further is the process of collecting register information shown in FIG. 6. As described above, the processes in steps S2 through S5 initialize the two sets IN[S] and OUT[S]. The value of IN[S] is individually calculated for each scheduling range, and OUT[S] is defined as an empty set.

After the value of the check flag is set to 0 in step S6, re-calculations are made for the two sets in the processes in steps S7 through S12 for each scheduling range. Therefore, the values of IN[S] and OUT[S] are variable. If the value of IN[S] varies, the value of the check flag is set to 1.

That is, the value of OUT[S] is calculated for each scheduling range in step S8. The set can be considered a sum of the set IN of the successors of the scheduling range S. The sum of the set IN of all successors is calculated as the value of OUT. OUT[S] is a subset of the sum of the set IN of the successors of the scheduling range S. The sum of the set IN for the successors is calculated for the purpose of shortening the compiling time and obtaining a correct result.

Since the value of the set OUT[S] can be variable in step S8, the value of IN[S] is calculated again in step S10 and is compared with the old value of IN, that is, OLD IN. If they are different from each other, then the value of the set OUT[S] needs a further re-calculation. Therefore, the value of the check flag is set to 1 in step S12, it is determined that control should return to step S6 in step S13, and the processes in steps S8 through S12 are performed again for all scheduling ranges.

These processes are repeated until the processes in steps S8 through S11 have been completed for all scheduling ranges with the value of the check flag set to 0, that is, until a predetermined state is entered. The value of KILL[S] is fixed in the equation of IN in step S10. IN and OUT are calculated to increment the elements of the sets. The increment of the set elements of these sets can be reduced by the original data. Since the original data remains unchanged, a predetermined state can be entered sometime, it is determined that the value of the check flag is 0 in step S13, and control is passed to the process performed by the instruction dependency analyzing unit 18.

Described below in detail is a practical example of collecting register information. The following program is used in the example of collecting the register information.

```
              << program >>
     REAL *8 A(100),B(100), S,FUNF
     S-FUNF (1.000)                          L0
                                             --------
     DO 1 I=1, 100
     A(I) = A(I) + S*B(I)
     A(I+1) = A(I+1) + S*B(I+1)              L1
     CONTINUE                                --------
     CALL SUB(A)
     END                                     L2
```

In this program, the scheduling ranges are L0, L1, and L2. L0 corresponds to the range before entering a DO loop, L1 corresponds to the range of the loop, and L2 corresponds to the range after the loop.

Listed below is the hardware required to execute this program including applicable registers, types of instructions, operating time for each instruction, structures of intermediate text, and structures to be selectively used.

<<hardware requirements>> applicable registers g0–g9 general purpose registers (4bytes)

f0–f9 floating point registers (4bytes)

Note) To retain the value of real*8, two consecutive floating point registers are used. However, only the leading register number is recorded.

LOAD/ST : M 2 r floating point operation: F 4 r integer operation: I 1 r branch instruction: B 1 r Two pairs (not identical pairs to each other) among M, F, I, and B can be issued simultaneously.

```
            << structure of intermediate text >>
struct GEN type {
struct GEN_type    *next_tn              ;/* next GEN
short int          gentype_code          ;/* type of operation
short int          genkind_code          ;/* GEN code
struct GEN_type    *back_tn;             /* back chain
void               *operand[6]
int                reg_no[6]
};
            << structure to be used selectively >>
            struct select_1{
            struct select_1 *next
            int             *reg_no
            struct GEN_type *first
            struct GEN_type *last
```

Shown below are the results of checking USE and KILL for each scheduling range in steps S3 and S4 shown in FIG. 6.

```
L0:
33:   entry{none}     gp1{sp, ret, fp}
34:   movehi{u4}      prg28{u4} cnt{2147483648}
                      [g8]
35:   call{none}      none lbd_"jwe_xcop" aad{gp1{prg28{u4}}}
                                                    [g8]
21:   movehi{u4}      std21{u4} ADC[.S0000000]
                      [g2]
22:   or{u4}          prg23{u4} std21{u4} ADC[.S0000000]
                      [g2]       [g2]
24:   call{r8}        std24{r8} erd_"FUNF" aad(gp1{prg23{u4}}}
                      [f0]                              [g2]
25:   move{r8}        prg11{r8} std24{r8}
                      [f2]       [f0]
26:   move{i4}        prg8{14} cnt(100)
                      [g2]
27:   move{i4}        prg9{14} cnt(8)
                      [g3]
28:   movehi{u4}      std25{u4} ADC[.B0000000+4096]
                      [g4]
29:   or{u4}          std26{u4} std25{u4} ADC[.B0000000+4096]
                      [g4]       [g4]
30:   add{u4}         prg27{u4} std26{u4} cnt(-3296)
                      [g5]       [g4]
31:   add{u4}         prg3{u4} std26{u4} cnt{-4096}
                      [g6]      [g4]
32:   add{u4}         prg10{u4} prg27{u4} cnt{8}
      IN = { }
      OUT = { }
      KILL={g2, g3, g4, g5, g6, g7, g8, f0, f2 }
      USE ={g2, g3, g4, g5, g6, g7, g8, f0, f2, sp, fp, ret}
```

-continued

```
L1:
 7:  load{r8}    std12{r8} BXD[prg10{u4} +-8]
                 [f0]              [g7]
 8:  mult{r8}    std13{r8} std12{r8} prg11{r8}
                 [f0]      [f0]       [f2]
 9:  load{r8}    std14{r8} BXD[prg10{u4} +-808]
                 [f4]              [g7]
10:  add{r8}     std15{r8} std14{r8} std13{r8}
                 [f0]      [f4]      [f0]
11:  store{r8}   BXD[prg10{u4} +-808] std15{r8}
                     [g7]              [f0]
12:  load{r8}    std16{r8} BXD[prg10{u4} +0]
                 [f0]              [g7]
13:  mult{r8}    std17{r8} std16{r8} prg11{r8}
                 [f0]      [f0]       [f2]
14:  load{r8}    std18{r8} BXD [prg3{u4} +prg9 {14}]
                 [f4]           [g6]      [g3]
15:  add{r8}     std19{r8} std18{r8} std17{r8}
                 [f0]      [f4]      [f0]
16:  store{r8}   BXD[prg3{u4} +prg9 {14}] std19{r8}
                     [g6]      [g3]        [f0]
17:  add{i4}     prg9{i4} prg9{i4} cnt {8}
                 [g3]     [g3]
18:  add{u4}     prg10{u4} prg10{u4} cnt {8}
                 [g7]      [g7]
19:  sub{i4}     ctd(prg8{i4}, prg20{cc}) prg8{i4} cnt{1}
                 [g2]                     [g2]
20:  bne{cc} {90.0}    oud#1 prg20 {cc}
     IN ={ }
     OUT ={ }
     KILL = {f0, f4}
     USE = {g2, g3, g6, g7, f0, f2, f4}
L2:
 0:  move{u4}    prg4{u4} prg3{u4}
                 [g8]     [g2]
 1:  call{none}  none erd_"SUB" aad {gp1 {prg4{u4}}}
                                     [g8]
 2:  movehi{u4}  std5{u4} ADC [.S0000000+24]
                 [g8]
 3:  or{u4}      prg7{u4} std5{u4} ADC[.S0000000+24]
                 [g8]     [g8]
 5:  call{none}  none lbd_"jwe_xstp" aad {gp1 {prg7{u4}}}
                                         [g8]
 6:  return{i4}  none gpl {sp, ret, fp}
     IN ={ }
     OUT ={ }
     KILL={g8}
     USE ={g2, g8, sp, ret, fp}
```

In FIG. 6, the value of the set IN is initialized in the process in step S5. Shown below is the result of the initialization. [Initialization]

```
IN[L0]  = OUT[L0]+USE[L0]-KILL[L0]
        = { } + {g2, g3, g4, g5, g6, g7, g8, f0, f2, sp, fp, ret} -
          {g2, g3, g4, g5, g6, g7, g8, f0, f2}
        = {sp, fp, ret}
IN[L1]  = OUT[L1]+USE[L1]-KILL[L1]
        = { } +{g2, g3, g6, g7, f0, f2, f4} - {f0, f4}
        = {g3 g3 g6 g7 f2}
IN[L2]  = OUD[L2]+USE[L2] - KILL[L2]
        = { } + {g2, g6, sp, ret, fp} - {g8}
        = {g2, sp, ret, fp}
```

If the initialization terminates, the processes in steps S8 through S12 are performed for all scheduling ranges after the value of the check flag is set to 0. This loop process is performed as follows.

<<first loop >>

```
checkf       = 0
OUT[L0]      = IN[L0] + IN[L1]
             = {sp,fp,ret,g2,g3,g6,g7,f2}
oldin        = IN[L0] ={sp,fp,ret}
IN[L0]       = OUT[L0] +USE[L0]-KILL[L0]
             = {sp,fp,ret,g2,g3,g6,g7,f2} +
               {g2,g3,g4,g5,g6,g7,g8,f0,f2,sp,fp,re -
               {g2,g3,g4,g5,g6,g7,g8,f0,f2}
             = {sp,fp,ret}
if (oldin 1 = IN[L0]) checkf = 1
OUT[L1]      = IN[L1] + IN[L2] + IN[L1]
             = {g2,g3,g6,g7,f2} + {g2,sp,ret,fp}
             = {g2,g3,g6,g7,f2,sp,ret,fp}
oldin        = IN[L1] = {g2,g3,g6,g7,f2}
IN[L1]       = OUD[L1] + USE[L1]-KILL[L1]
             = {g2,g3,g6,g7,f2,sp,ret,fp} +
               {g2,g3,g6,g7,f0,f2,f4} - {f0,f4}
             = {g2,g3,g6,g7,f2,sp,ret,fp}
if (oldin 1 = IN[L1]) checkf = 1 <<-
OUT[L2]      = IN[L2]
             = {g2,sp,fp,ret}
oldin        = IN[L2] = {g2,sp,fp,ret}
IN[L2]       = OUD[L2]+USE[L2] - KILL[L2]
             = {g2,sp,ret,fp}+
               {g2,g8,sp,ret,fp} - {g8}
             = {g2,sp,fp,ret}
if (oldin 1= IN[L1]) checkf = 1
if (checkf == 1 ) goto LOOP <<-
else EXIT LOOP
```

In the process of the first loop, the value of the check flag is 1 when the value of IN[L1] is compared with the old value. Thus, control returns to step S6 via step S13. The process of the second loop in steps S7 through S12 is listed below.

<<second loop>>

```
OUT[L1]      = IN[L1] + IN[L2] + IN[L1]
             = {g2,g3,g6,g7,f2,sp,ret,fp} + {g2,sp,ret,fp}
             = {g2,g3,g6,g7,f2,sp,ret,fp}
oldin        = IN[L1] = {g2,g3,g6,g7,f2,sp,ret,fp}
IN[L1]       = OUD[L1] + USE[L1]-KILL[L1]
             = {g2,g3,g6,g7,f2,sp,ret,fp} +
               {g2,g3,g6,g7,f0,f2,f4} -{f0,f4}
             = {g2,g3,g6,g7,f2,sp,ret,fp}
if (oldin 1 = IN[L1]) checkf = 1
OUT[L2]      = IN[L2]
             = {g2,sp,fp,ret}
oldin        = IN[L2] = {g2,sp,fp,ret}
IN[L2]       = OUD[L2]+USE[L2] - KILL[L2]
             = {g2,sp,ret,fp}+{g2,g8,sp,ret,fp} - {g8}
             = {g2,sp,fp,ret}
if (oldin 1 = IN[L1]) checkf = 1
if (checkf == 1 ) goto LOOP
else EXIT LOOP
```

<<-exiting from the loop

In the second loop process, the value of the check flag remains 0. It is determined in step S13 that the value of the check flag is 0, and the register information collecting process terminates. The final contents of the register information management table for each scheduling range are as follows.

```
L0:
IN     = {sp,fp,ret}
USE    = {g2,g3,g4,g5,g6,g7,g8,f0,f2,sp,fp,ret}
OUT    = {sp,fp,ret,g2,g3,g6,g7,f2}
L1:
IN     = {g2,g3,g6,g7,f2,sp,fp,ret}
USE    = {g2,g3,g6,g7,f0,f2,f4}
OUT    = {sp,fp,ret,g2,g3,g6,g7,f2}
L2:
IN     = {g2,sp,fp,ret}
```

|     |                    |
| --- | ------------------ |
| USE | = {g2,g8,sp,fp,ret} |
| OUT | = {g2,sp,fp,ret}    |

[Process of Instruction Dependency Analyzing Unit 18]

Figure 7:
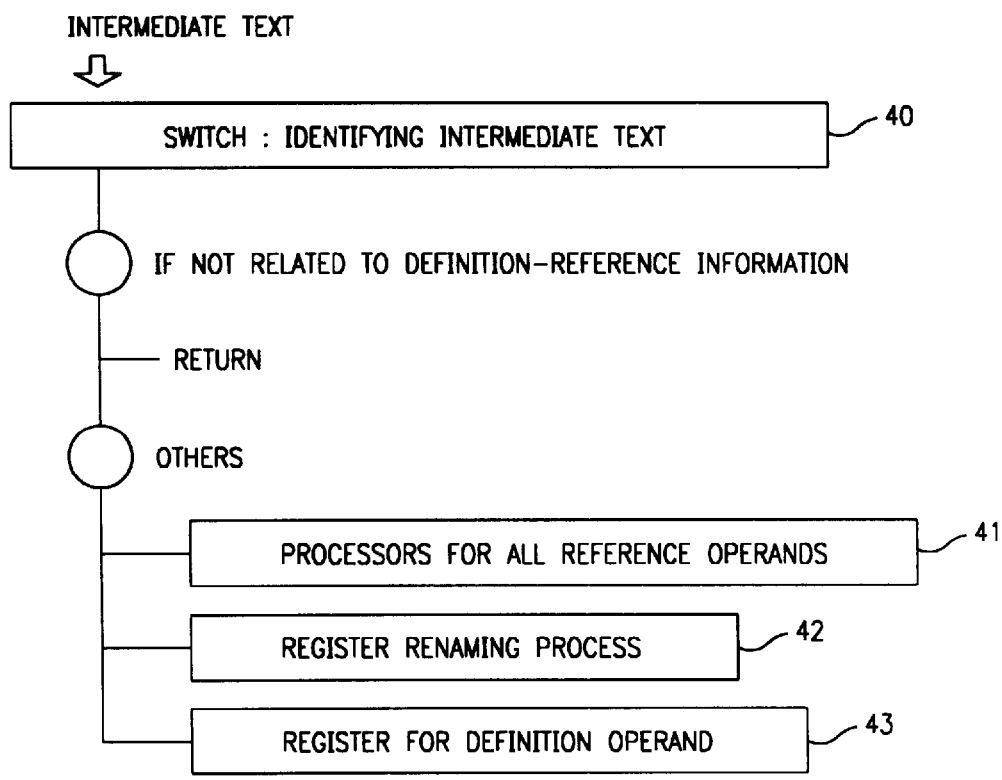
FIG. 7 is a flowchart of the processes performed by the instruction dependency analyzing unit.

An important process performed by the instruction dependency analyzing unit 18 is to analyze the dependency among the intermediate text. The process is performed by the instruction dependency analyzing unit 18 as shown in FIG. 7. The intermediate text is identified (process 40 shown in FIG. 7) for each intermediate text in the range of the present scheduling process. If the intermediate text is not related to definition or reference information, then control is returned without any process (RETURN). Otherwise, an analyzing process 41 is performed on all reference operand. Then, the register renaming unit 19 is invoked to perform a register renaming process 42. Performed next is an analyzing process 43 on a definition operand. This process is similar to the conventional instruction scheduling except that the register renaming process is invoked prior to the analysis of the definition operand. That is, in the instruction dependency analyzing unit 18, the register renaming process is performed before processing a defined register in the operation, thereby clearing unnecessary dependency.

[Process of Register Renaming Unit 19]

Figure 8:
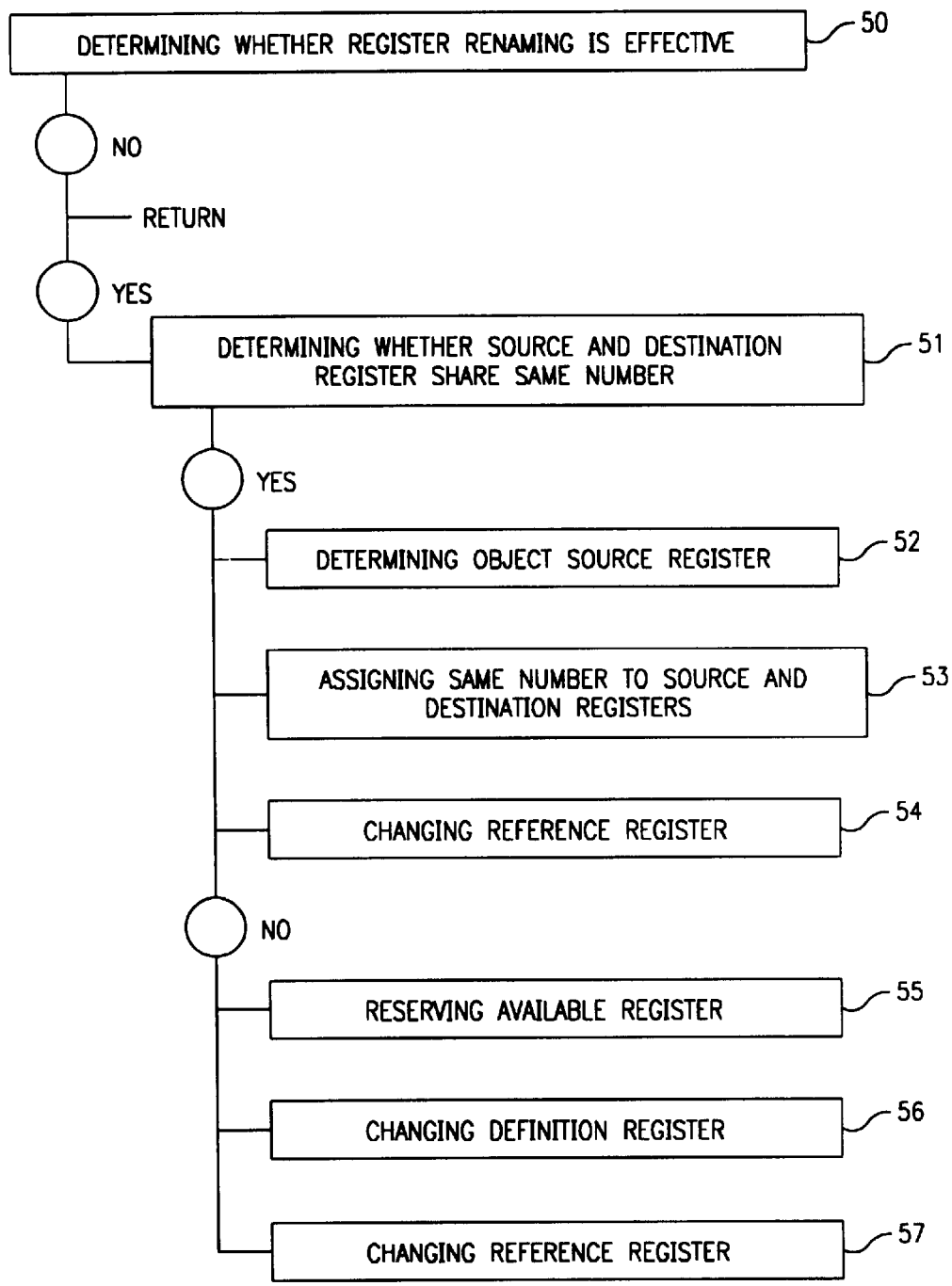
FIG. 8 is a flowchart of the processes performed by the register renaming unit.

Described next is the process performed by the register renaming unit 19 invoked by the instruction dependency analyzing unit 18. FIG. 8 shows the flow of the operations performed in the register renaming process.

The renaming process is performed based on intermediate text. Some intermediate text yield no effect from register renaming. The examples are the setting of the equivalent of a call instruction and an argument where a register of a predetermined number is used. After a determining process 50 in which it is determined whether or not the register renaming process is effective, processes with no renaming effect are removed from the objects of the register renaming process depending on the operation code or register number of the intermediate text.

Then, a determining process 51 is performed as to whether or not the source register can share the same number with the destination register. The following items are checked in this process.

Condition 1: The destination register is first defined here, and defined again after a reference is made to it.

Condition 2: Unless the register is defined again, it exits from the range of scheduling and is not alive.

Condition 3: The value of the source register is not referred to after the intermediate text.

Alive registers at the input/output of each scheduling block are stored in the register information management table 30. Each piece of intermediate text is assigned a register number defined and referred to in the operation. According to the first embodiment, the above listed conditions are checked bet scanning the intermediate text to be renamed within the range of scheduling.

Performed after all of the above listed three conditions are satisfied are an object source register determining process 52, a source-destination-register-number matching process 53, and a reference register changing process 54.

If a destination register is replaced with a source register, then the intermediate text is scanned before the register is defined again or the range of scheduling is processed so that register number of the reference operand is replaced with the replacing number.

Figure 9:
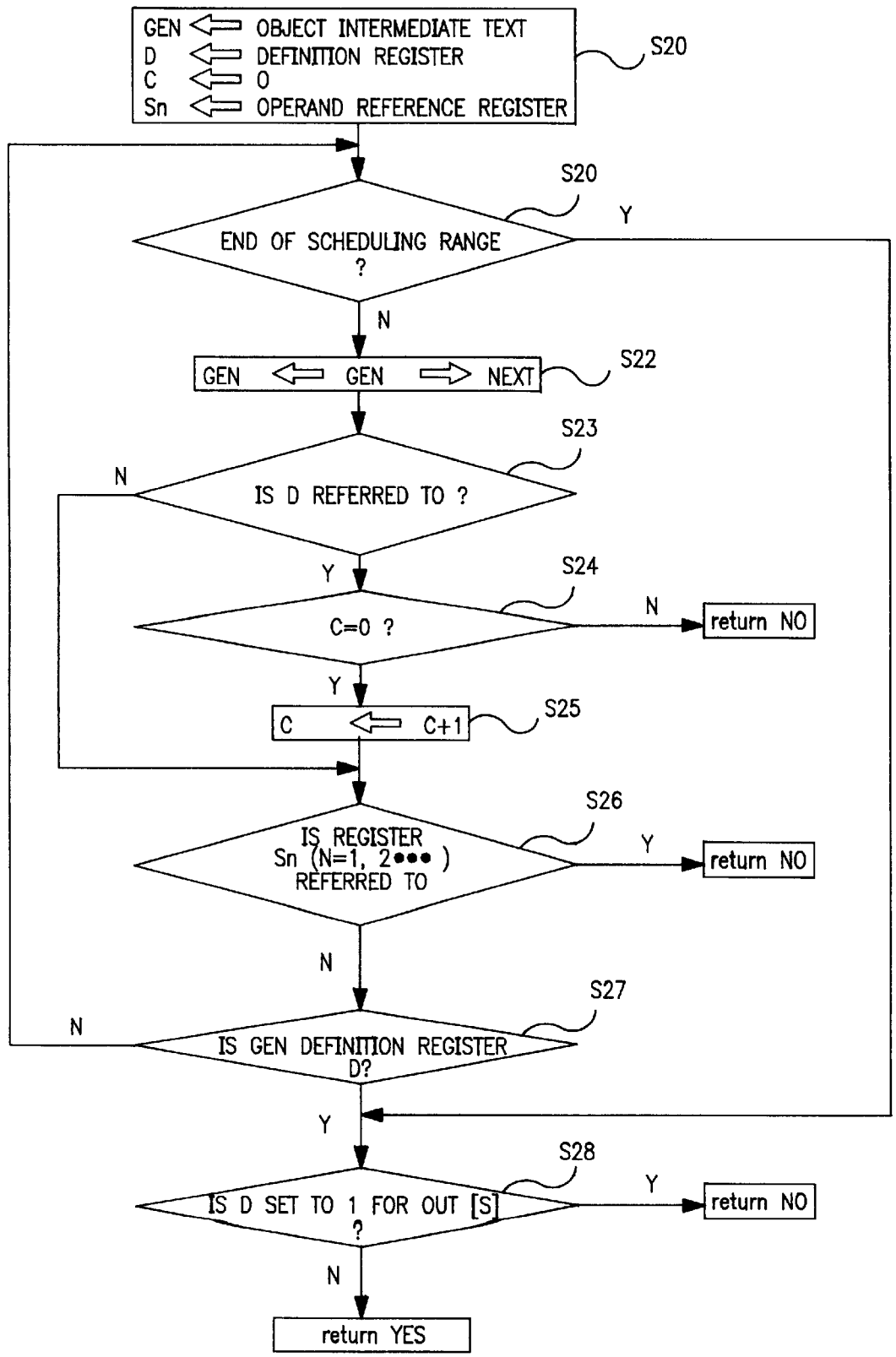
FIG. 9 is a detailed flowchart showing the process of determining whether or not the source and destination registers can share the same number.

Described below by referring to the flowchart shown in FIG. 9 is the determination under conditions 1 through 3, that is, the determination as to whether or not a source register can share the same number with the destination register. FIG. 9 is a detailed flowchart showing the process of determining whether or not the source register can share the same number with the destination register for an object intermediate text. In FIG. 9, the process starts after setting in step S20 an object intermediate text as GEN; a destination register as D; the value of a counter to 0; the source register as Sn (n=1, 2, . . . ).

First, in step S21, it is determined whether or not the scheduling range covering the object intermediate text has been processed. If not, the next intermediate text of the present GEN is set as GEN in step S22. In steps S23, it is determined whether or not the value of D of the destination register has been referred to. If yes, it is determined in step S24 whether or not the counter value C is 0.

The counter value indicates the times D has been referred to. If the value is 0, the above described condition 1 is satisfied, that is, the determination as to whether or not the destination register is referred to for the first time indicates yes. Therefore, unless the value is 0, it is determined that the two registers cannot share the same number, and the determination process immediately terminates.

If it is determined in step S24 that the counter value C is 0, the value C is incremented in step S25 and it is determined in step S26 after the value indicates 1 whether or not any of the source registers Sn has been referred. If yes, it is determined that the above described condition 3 is not satisfied, the two registers cannot share the same number, and the determination process immediately terminates.

If it is determined in step S26 that the source register has not been satisfied, then it is determined in step S27 whether or not the destination register for the present intermediate text GEN is assigned D. If not, the processes in and after steps S21 are repeated to perform the processes for the next intermediate text.

If it is determined in step S24 that the counter value C is not 0, that is, if the reference has not been made once, then it is determined that the two registers cannot share the same number and the process terminates. However, one reference is not an essential condition. Fundamentally, the references can be made any number of times, but the present invention sets this condition to shorten the compile time and facilitate the entire process.

If the processes have been completed for the scheduling range of the intermediate text to be processed in steps S22 through S27, then control is passed to the processes in steps S21 through S28 and it is determined after the scheduling range has been quit whether or not the destination register D is alive, that is, whether or not the value for the bit vector described by referring to FIG. 4 indicates 1.

If yes, it is determined that the above described condition 2 is not satisfied, and the two registers cannot share the same number. If not, it is determined that the two registers share the same number and the process terminates.

If the destination register D is not defined and conditions 1 and 3 are satisfied after the intermediate text to be processed in the scheduling range, then the destination in step S27 indicates N and condition 2 is checked in step S28 after the scheduling range has been processed in step S21.

Described below is a practical example of the process shown in FIG. 9.

The intermediate text GEN in step S20 refers to the following add instruction.

add *R1, R2, R3 (R3=R1+R2)*

D indicates R3, $S_1$ indicates R1, and $S_2$ indicates R2.

The determination in step S26 corresponds to the determination as to whether or not $S_1$ or $S_2$ has appeared as a reference operand in or after the intermediate text to be processed in the scheduling range. The intermediate text in the scheduling range is represented as follows.

(1) add R1, R2, R3

(2) add R3, R5, R6

(3) add R1, R7, R8

As described above, the intermediate text refers to the add instruction (1). The intermediate text in the third line (3) refers to source register R1, that is, $S_1$. Accordingly, result (1) indicates that the two registers cannot share the same number. That is, no change cannot be made to replace (1) with the following instruction.

add *R*1, *R*2, *R*1

Condition 2 is described furthermore. As described above, condition 2 is determined in step S27. In condition 2, "if no definition is made" indicates that "if no definition is made after the object intermediate text". The following example shows the exception of condition 2.

S1:

add r1, r1, r2←object intermediate text

The scheduling range has been completed with r3 undefined.

goto S2 OUT[S] ( . . ,r3, . .)

S2:

add r3, r4, r5←r3 is used in another scheduling range.

In this example, the destination register of the object intermediate text, that is, r3, is referred to in scheduling range $S_2$. In this case, destination register r3 cannot be renamed. If the register is defined for the scheduling range of the object intermediate text, then the defined scheduling range is processed and control is passed from step S27 to step S28 as shown in FIG. 9.

The process shown in FIG. 9 is a determination process as to whether or not the destination register and the source register can share the same number. The process is performed to reduce the number of registers to be used, not to remove only through this process the dependency between the two above described instructions. For example, if the following instructions are issued;

add *r*1, *r*2, *r*3 add *r*3, *r*4, *r*5 and the destination register and the source register can share the same number in the first instruction, then the instruction can be:

add r1, *r*2, *r*1

*add r*1, *r*4, *r*5 and the change of instructions allows register r3 to be available in a parallel process.

A renaming process is performed on a definition operand if the source register cannot share the same number with the destination register. The renaming process is performed on the definition operand in the following steps.

Available registers are reserved in process 55 shown in FIG. 8. The numbers of the available registers can be checked on the register information management table 30 generated for each range of scheduling. Available registers are reserved by listing the registers which meet the following conditions according to the first embodiment. Severer conditions can also be set.

Condition 1: Not alive at input.

Condition 2: Not alive at output.

Condition 3: Not used in a scheduling block.

Registers completely meeting the three conditions are determined to be available registers.

If the available registers have been successfully reserved, then the registers for the definition operand are renumbered according to the numbers of the reserved registers.

In process 57, the registers of the reference operand are renumbered.

Furthermore, the following method is adopted in the first embodiment to re-use available registers.

(1) If the registers for the definition operand and the reference operand are renumbered, the intermediate text involved are stored. Thus, a start entry and an end entry are added on the availability list to store the number of the defined intermediate text in the start entry and the number of the last-referred-to intermediate text in the end entry.

(2) Used register numbers are entered as the last entries on the availability list.

(3) Added is the description "The number of the intermediate text to be renamed should refer to the point beyond the last entry." As the condition for reserving available registers.

The above listed items allow available registers to be re-used.

The instruction schedule process unit 20 rearranges the instructions based on the result of the register renaming process to prevent the delay in a pipeline process and realize instruction scheduling with the instructions appropriately executed in parallel by a computer having a plurality of operating units. Since the process is otherwise similar to the conventional instruction scheduling process, detailed explanation of all such processes is omitted here.

Figure 10:
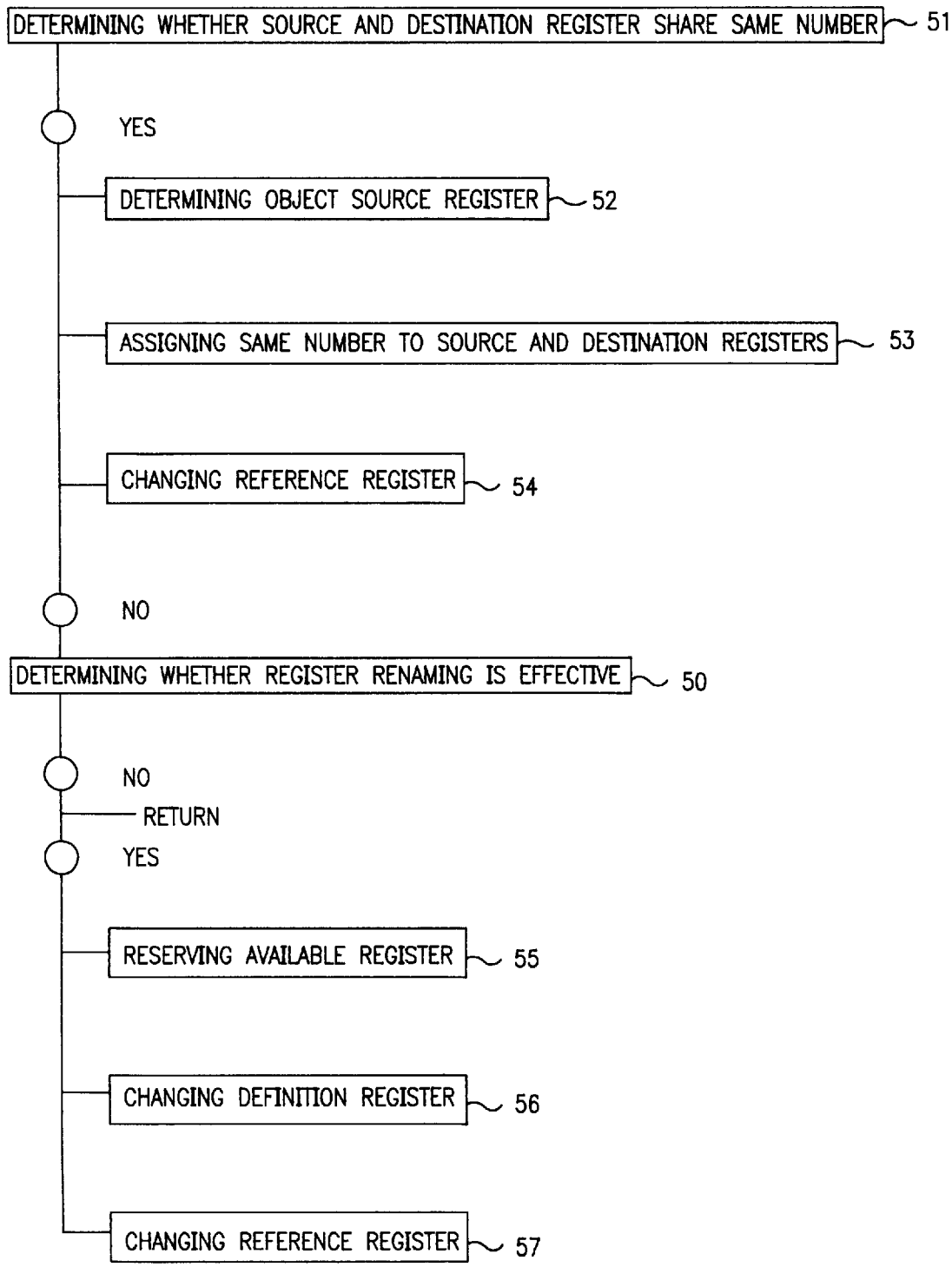
FIG. 10 is a flowchart showing the process of determining the effectiveness of renaming the registers when the source and destination registers cannot share the same number.

First, in FIG. 8, it is determined in the determination process 50 as to whether or not the register is to be renamed. In this determination process, it is determined whether or not any dependency such as definition-reference, reference-definition, or definition-definition relation exists between the two instructions so as to determine the possibility of improved parallelism. Therefore, the dependency between the two instructions is released by a register renaming process even if it is determined that the source and destination registers cannot share the same number in the determination process 51. When the parallelism of the processes can be improved, the processes in steps S55 through S57 are performed. The determination process as to whether or not the registers are effectively renamed can be performed when it is determined that the source register and the destination register cannot share the same number. FIG. 10 is a flowchart showing the process of renaming the registers in such a case. In FIG. 10, the determination process 50 as to whether or not the registers are effectively renamed is performed when it is determined that the source and destination registers cannot share the same number. If they can be effectively renamed, the processes S55 through S57 are performed.

Figure 11:
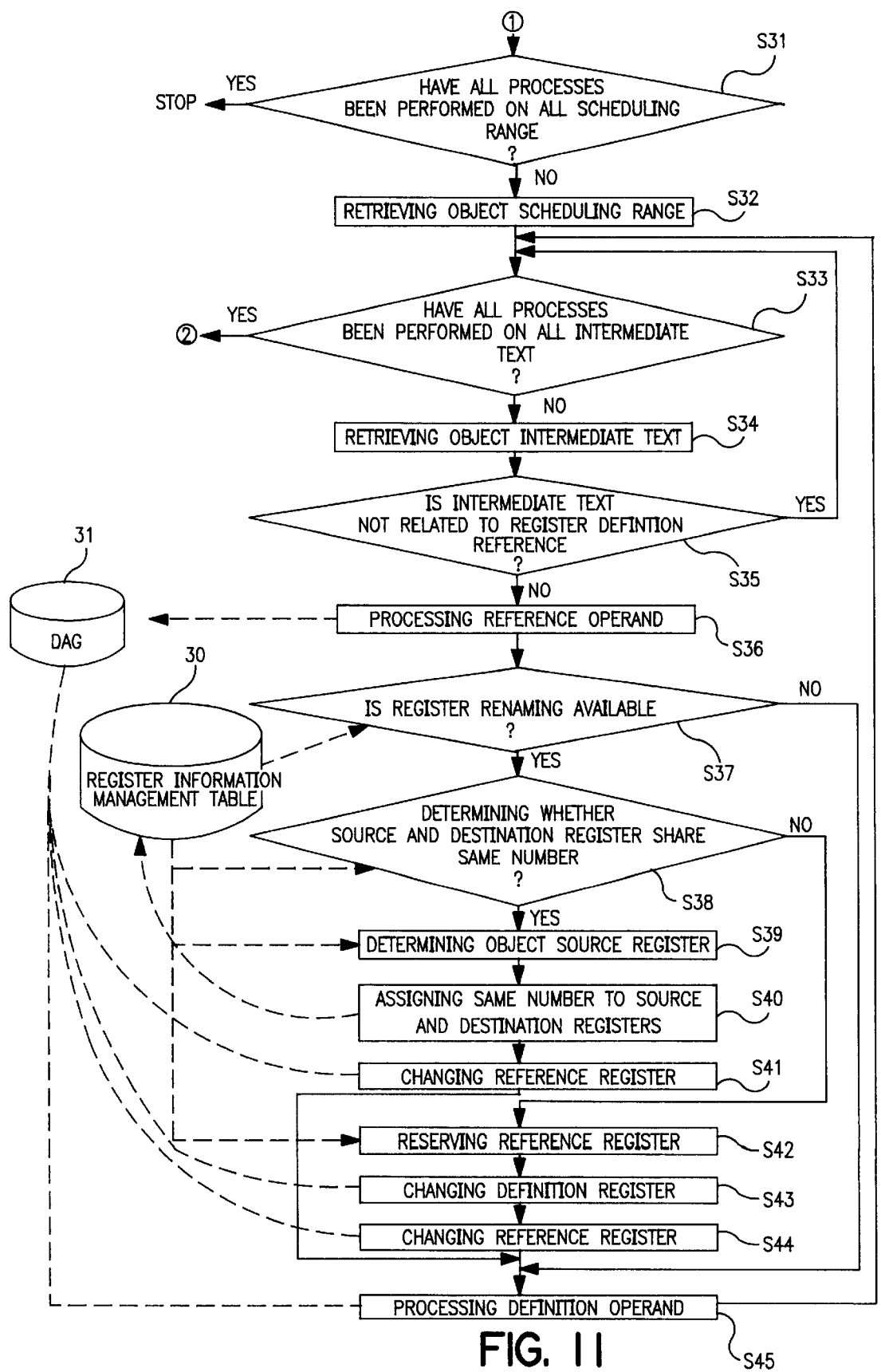
FIG. 11 is a general flowchart showing the processes according to the first embodiment.
Figure 12:
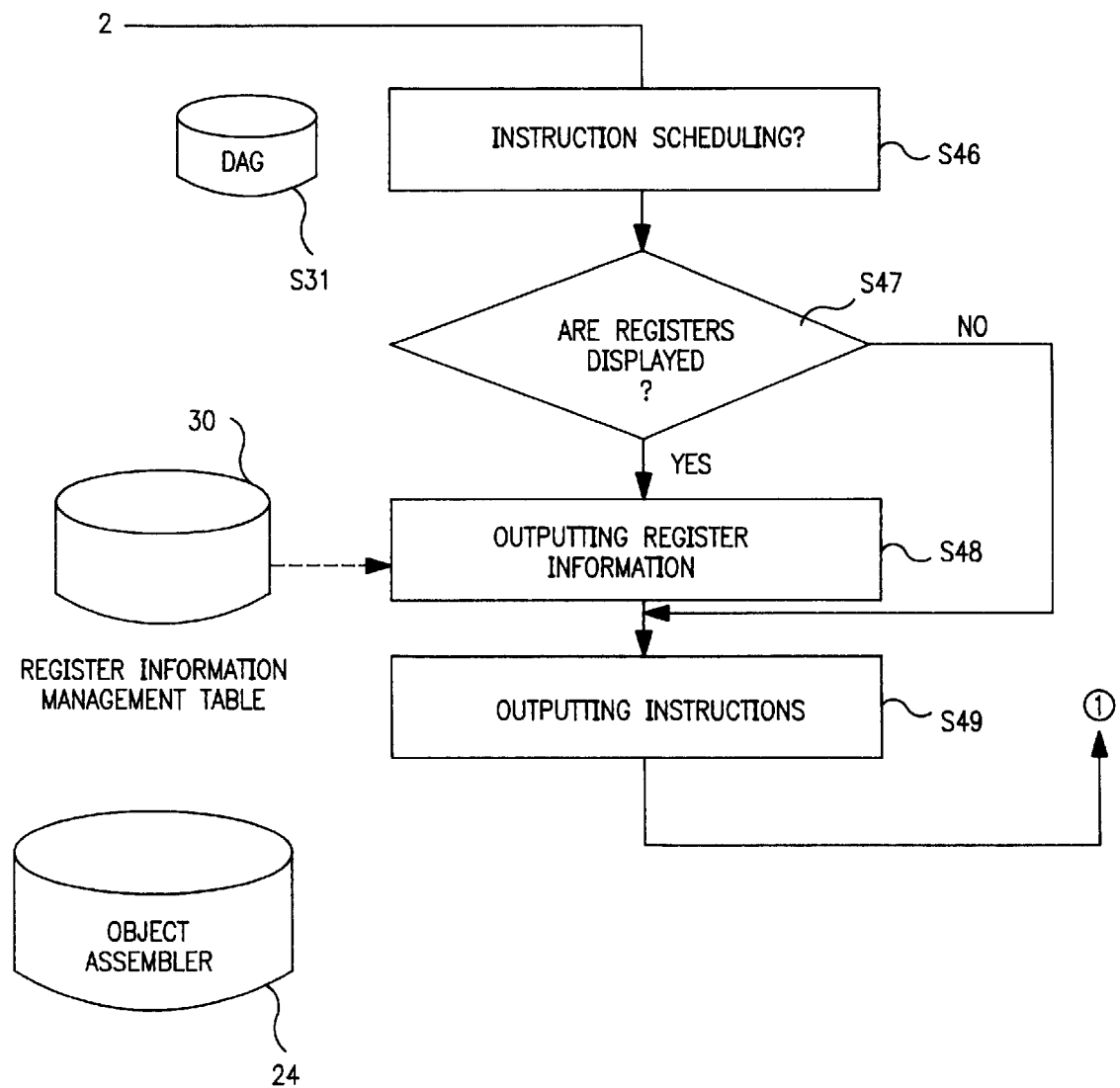
FIG. 12 is a general flowchart (continued) showing the processes according to the first embodiment.

FIGS. 11 and 12 are the summary of the embodiment (first embodiment) of the processes performed by the instruction scheduling unit described by referring to FIGS. 5, 7, and 8. The processes shown in these figures are performed after the register information collecting process explained by referring to FIG. 6.

Steps S31 through S33 correspond to the processes shown in FIG. 5, while the processes in steps S34 through 45 correspond to the processes performed by the instruction dependency analyzing unit shown in FIG. 7. The processes in steps S37 through S44 correspond to the register renaming process shown in FIG. 8.

Generated in the reference operand process in step S36 is a directed acyclic graph (DAG) which indicates the dependency among the operations corresponding to respective instructions. That is, a DAG node is generated for each intermediate text, and a dependency link is established between a node for an intermediate text and another node in which an operand referred to in the intermediate text is defined to generate a DAG 31. For example, if the source register is renamed in step S41, then the contents of the DAG 31 are changed correspondingly. A practical example of a DAG is described later.

In the register renaming process, the contents of the register information management table 30 are referred to. For example, the determination process in step S37 as to whether or not the registers are effectively renamed is performed using the contents of the register information management table 30. If it is determined in step S38 that the source and destination registers can share the same number, the two registers are renamed to share the same number and the contents of this process are stored in the register information management table 30. The process in step S45 is not essential to the present invention, but only a single step in generating the DAG.

FIG. 12 shows the processes performed after the processes shown in FIG. 11. These processes are performed when it is determined in step S33 shown in FIG. 11 that the processes for the entire intermediate text are completed. In step S46, the instruction scheduling process is performed using the contents of the DAG 31. In step S47, it is determined whether or not the register information is displayed. If yes, the register information is output as debug information 25 as described later using the contents of the register information management table 30 in step S48. If the register information is not to be displayed, the process in step S48 is omitted. Control returns to step S31 shown in FIG. 11 after the instruction code is output as an object program 24 in step S49, and the compiling process terminates when it is determined that the processes have been completed for the entire scheduling range in step S31.

Figure 13:
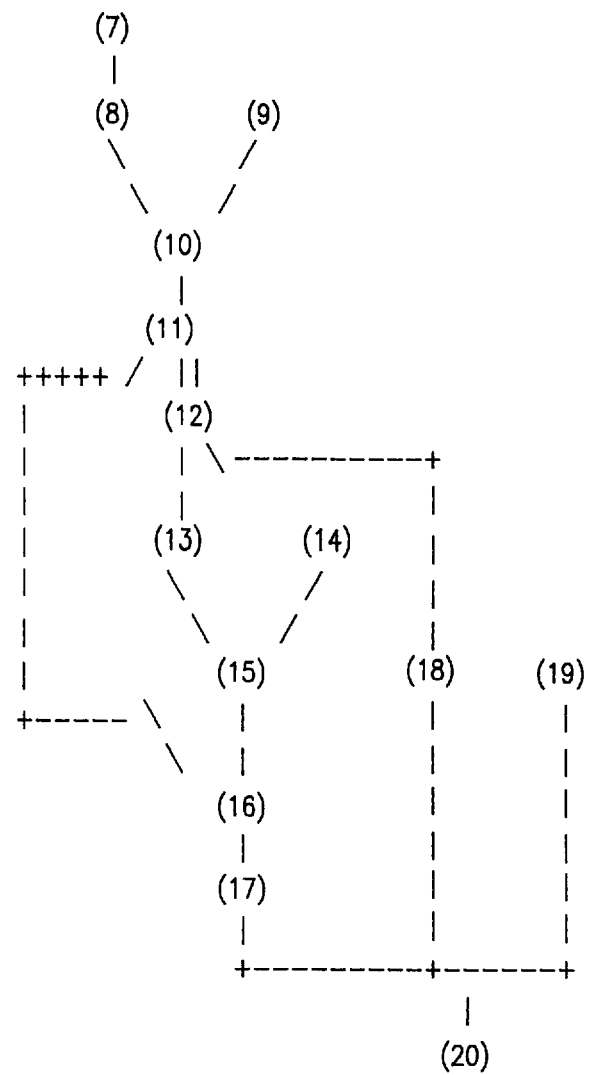
FIG. 13 shows the dependency among the instructions in the scheduling range L1.

Described in detail below by using a part of the program used in the practical example of the register information collecting process is a practical example of a register renaming process according to the present invention. FIG. 13 shows the dependency among the instructions in the above described scheduling range L1 (corresponding to the DAG). The number of each intermediate text corresponds to the number used in explaining the process of checking USE and KILL.

For example, in processing the intermediate text 11, the contents of register 50 are referred to, that is, read, by a store instruction. In processing the intermediate text 12, register 50 is defined, that is, written, by a load instruction. The intermediate text 11 and 12 are reference-definition-relation related.

Described below is the process in which the register renaming process of the present invention is not adopted.

```
L1:
    load    (gr7-8), f0         (7)
    subcc   g2,1,g2             (19)
-
    load    (gr7-808), f4       (9)
-
    fauld   f0,f2,f0            (8)
-
    nop
-
```

```
-continued nop
-
    nop
-
    faddd   f0,f4,f0            (10)
-
    nop
-
    nop
-
    nop
-
    store   f0, (g7-808)        (11)
-
    load    (g7+0), f0          (12)
    add     g7,9,g7             (14)
-
    load    (g4+g3), f4         (14)
-
    fauld   f0,f2,f0            (13)
-
    nop
-
    nop
-
    nop
-
    faddd   f0,f4,f0            (15)
-
    nop
-
    nop
-
    nop
-
    store   f0, (g6+g1)
-
    add     g3,8,g3             (17)
    bne LOOP
-
```

In this case, there is the process time of 23τ per DO loop of the above described program.

Described below is the process in which the register renaming process according to the present invention is adopted.

When the GUN in FIG. 9 is the intermediate text 12, it is determined that the source and destination registers can share the same number, and register f6 is reserved as a register satisfying all conditions 1 through 3 to determine available registers depending on the contents of the register information management table. Then, the definition operand of the intermediate text 12 is changed into f6, and the reference operand of the intermediate texts after 12 are changed through the reference operand change process.

```
7:  load{r8}    std12{r8} BXD [prg10{u4} +-6]
                [f0]       [g7]
8:  mult{r8}    std13{r8} std12{r8} prg11{r8}
                [f0]       [f0]      [f1]
9:  load{r8}    std14{r8} BXD [prg10{u4} +-808]
                [f4]       [g7]
10: add{r8}     std15{r8} std14{r8} std13{r8}
                [f4]       [f4]      [f0]
11: store{r8}   BXD {prg10{u4}+-208} std15{r8}
                     [g7]              [f0]
12: load{r8}    std15{r8} BXD [prg10{u4} +0]
                [f6]       [g7]
13: mult{r8}    std17{r8} std16{r8} prg11{r8}
                [f0]       [f6]      [f2]
14: load{r8}    std18{r8} BXD [prg3{u4}+prg3 {14}]
                [f4]       [g6]      [g3]
15: add{r8}     std19{r8} std18{r8} std17{r8}
                [f0]       [f4]      [f0]
```

-continued

| | | |
|---|---|---|
| 16: store{r8} | BXD [prg3{u4} +prg9 {14}] std19{r8} | |
| | [f6]    [g3]    [f0] | |
| 17: add{f4} | prg9 {14} prg9 {14} cnt{r8} | |
| | [g3]    [g3] | |
| 18: add{u4} | prg10{u4} prg10{u4} cnt {8} | |
| | [g7]    [g7] | |
| 19: sub{i4} | ctd (prg6 {14}, prg20 {cc}) prg8 {14} cnt {1} | |
| | [g2]    [g2] | |
| 20: bne {cc} | oud#1 prg20 {cc} | |
| {90.0} | | |

Likewise, it is determined that the source and destination registers can share the same number for the definition operand of the intermediate text 13, and the definition operand of the intermediate text 13 is defined as f6. The reference operand of the intermediate texts of and after 13 are changed as follows.

| | | |
|---|---|---|
| 7: load{r8} | std12{r8} BXD [prg10{u4}+−8] | |
| | [f0]    [g7] | |
| 8: mult{r8} | std13{r8} std12{r8} prg11{r8} | |
| | [f0]    [f0]    [f2] | |
| 9: load{r8} | std14{r8} BXD(prg10{u4}+−808) | |
| | [f4]    [g7] | |
| 10: add{r8} | std15{r8} std14{r8} std13{r8} | |
| | [f0]    [f4]    [f0] | |
| 11: store{r8} | BXD(prg10{u4}+−808) std15{r8} | |
| | [g7]    [f0] | |
| 12: load{r8} | std14{r8} BXD [prg10{u4}+9] | |
| | [f8]    [g7] | |
| 13: mult{r8} | std17{r8} std16{r8} prg11{r8} | |
| | [f8]    [f8]    [f2] | |
| 14: load{r8} | std18{r8} BXD [prg3{u4}+prg9 {14}] | |
| | [f4]    [g6]    [g3] | |
| 15: add{r8} | std19{r8} std18{r8} std17{r8} | |
| | [f0]    [f4]    [f6] | |
| 16: store{r8} | BXD[prg3{u4}+prg5 {14}] std19 {r6} | |
| | [g8]    [g5]    [f0] | |
| 17: add{i4} | prg3 {14} prg9 {14} cnt {8} | |
| | [g3]    [g3] | |
| 18: add{u4} | prg10{u4} prg10{u4} cnt {8} | |
| | [g7]    [g7] | |
| 19: sub{i4} | ctd (prg8 {14}, prg20 {cc}) prg8 {14} cnt {1} | |
| | [g2]    [g2] | |
| 20: bne {cc} | oud#1 prg20 {cc} | |
| {90.0} | | |

The renaming conditions exist for the intermediate 14 as in the case of the text 12 as follows.

| | | |
|---|---|---|
| 7: load{r8} | std12{r8} BXD[prg10{u4}+−8] | |
| | [f0]    [g7] | |
| 8: mult{r8} | std13{r8} std12{r8} prg11{r8} | |
| | [f0]    [f0]    [f2] | |
| 9: load{r8} | std14{r8} BXD [pgr10{u4}+−808] | |
| | [f4]    [g7] | |
| 10: add{r8} | std15{r8 std14{r8} std13 {r4} | |
| | [f0]    [f4]    [f0] | |
| 11: store{r8} | BXD[prg10{u4}+−808] std15{r8} | |
| | [g7]    [f0] | |
| 12: load{r8} | std16{r8} BXD [prg10{u4}+−0] | |
| | [f6]    [g7] | |
| 13: mult{r8} | std17{r8} std16{r8} prg11{r8} | |
| | [f6]    [f6]    [f2] | |
| 14: load{r8} | std18{r8} BXD [prg3{u4}+prg9 {14}] | |
| | [f8]    [g6]    [g3] | |
| 15: add{r8} | std19{r8} sd18{r8} std17{r8} | |
| | [f0]    [f8]    [f6] | |
| 16: store{r8} | BXD[prg3{u4}+prg9 {14}] std13{r8} | |
| | [g6]    [g3]    [f0] | |
| 17: add{i4} | prg3 {14} prg3 {14} cnt {8} | |
| | [g3]    [g3] | |
| 18: add{u4} | prg10{u4} prg10{u4} cnt {8} | |
| | [g7]    [g7] | |
| 19: sub{i4} | ctd(prg8 {f4}, prg20 {cc}) prg6 {14} cnt {1} | |
| | [g2]    [g2] | |
| 20: bne{cc} | oud#1 prg20 {cc} | |
| {90.0} | | |

The similar process is performed on the intermediate text 15 and the final process result is obtained as follows.

| | | |
|---|---|---|
| 7: load{r8} | std12{r8} BXD [prg10{u4}+−8] | |
| | [f0]    [g7] | |
| 8: mult{r8} | std13{r8} std12{r8} prg11{r8} | |
| | [f0]    [f0]    [f2] | |
| 9: load{r8} | std14{r8} BXD[prg10{u4+−808] | |
| | [f4]    [g7] | |
| 10: add{r8} | std13{r8} std14{r8} std13{r8} | |
| | [f0]    [f4]    [f0] | |
| 11: store{r8} | BXD(prg10{u4}+−808) std15{r8) | |
| | [g7]    [f0] | |
| 12: load{r8} | std16{r8} BXD[prg10{u4}+0] | |
| | [f6]    [g7] | |
| 13: mult{r8} | std17{r8} std16{r8} prg11{r8} | |
| | [f6]    [f6]    [f2] | |
| 14: load{r8} | std18{r8} BXD(prg3{u4}+prg9 {14}] | |
| | [f8]    [g6]    [g3] | |
| 15: add{r8} | std19{r8} std18{r8} std17{r8} | |
| | [f8]    [f8]    [f6] | |
| 16: store{r8} | BXD[prg3{u4+pr9 {14}] std19{r8} | |
| | [g6]    [g3]    [f6] | |
| 17: add{i4} | prg9 {14} prg9 {14} cnt {8} | |
| | [g3]    [g3] | |
| 18: add{u4} | prg10{u4} prg10{u4} cnt {8} | |
| | [g7]    [g7] | |
| 19: sub {i4} | ctd(prg8 {14}, prg20 {cc}) prg8{14} cnt {1} | |
| | [g2]    [g2] | |
| 20: bne {cc} | oud#1 prg20 {cc} | |
| {90.0} | | |

Figure 14:
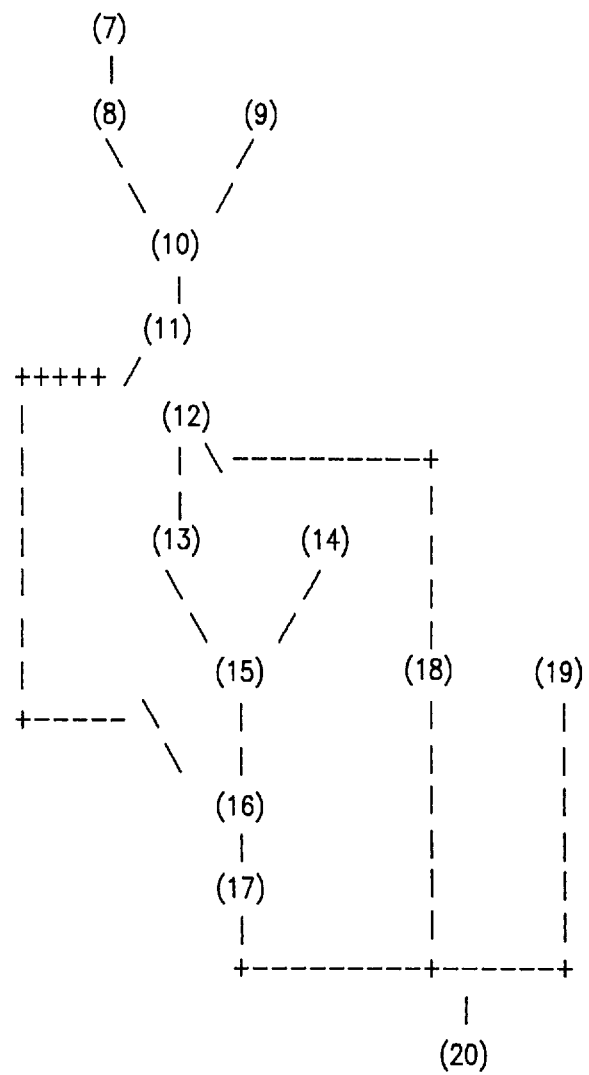
FIG. 14 shows the result of the register renaming process for the scheduling range L1.

FIG. 14 shows the dependency among the instructions as the final result of the register renaming process. As compared with FIG. 13, the write-after-read dependency between the intermediate texts 11 and 12 is deleted in FIG. 14. As a result, the following processes are performed and the required process time is reduced to 14τ per DO loop of the program, that is, two-thirds of 23τ shown in FIG. 13.

| | | | |
|---|---|---|---|
| | load | [gr7−8], f0 | (7) |
| | subcc | g2, 1, g2 | (19) |
| − | | | |
| | load | [g7+0], f6 | (12) |
| − | | | |
| | load | [gr7−808]f4 | (9) |
| | fmuld | f0, f2, f0 | (8) |
| − | | | |
| | load | [g6+g3], f8 | (14) |
| | add | g7, 8, g7 | (14) |
| − | | | |
| | fmuld | f6, f2, f6 | (13) |
| − | | | |
| | nop | | |
| − | | | |
| | nop | | |
| − | | | |
| | faddd | f0, f4, f0 | (10) |
| − | | | |
| | faddd | f6, f8, f6 | (15) |
| − | | | |
| | nop | | |
| − | | | |
| | nop | | |
| − | | | |

-continued

| | store | f0, [g7-808] | (11) |
|---|---|---|---|
| | store | f6, [g6+g3] | |
| | add | g3, 8, g3 | (17) |
| | bne LOOP | | |

Figure 15:
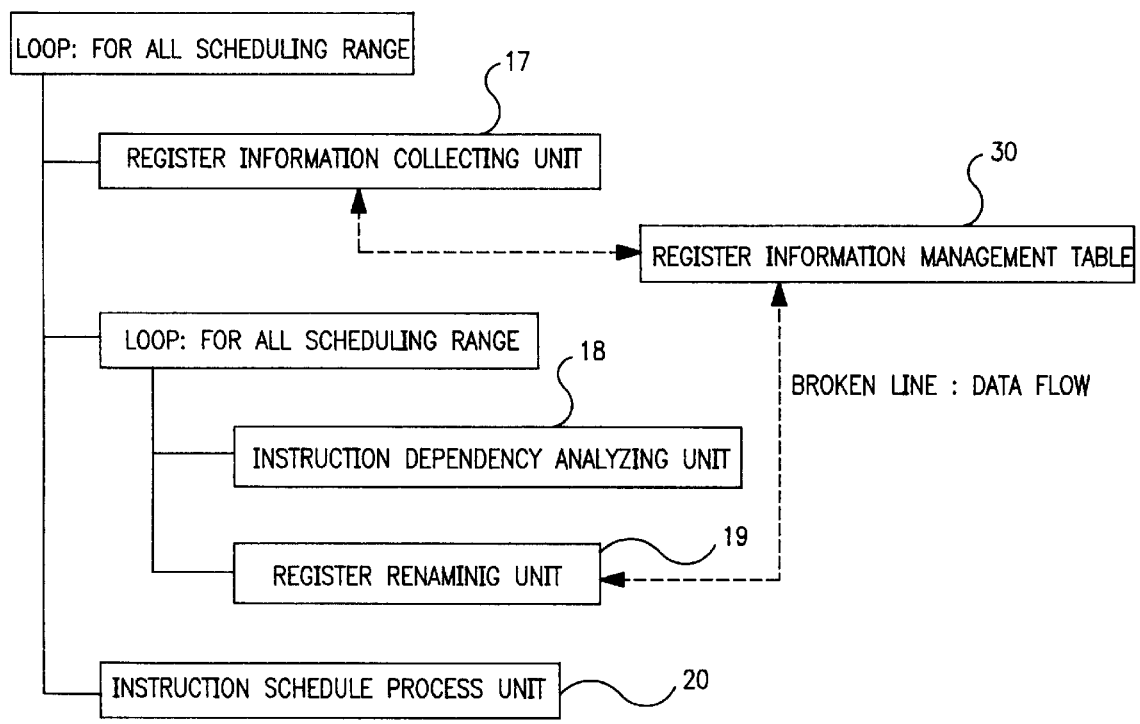
FIG. 15 shows the processes performed by the instruction scheduling unit according to a second embodiment of the present invention.
Figure 16:
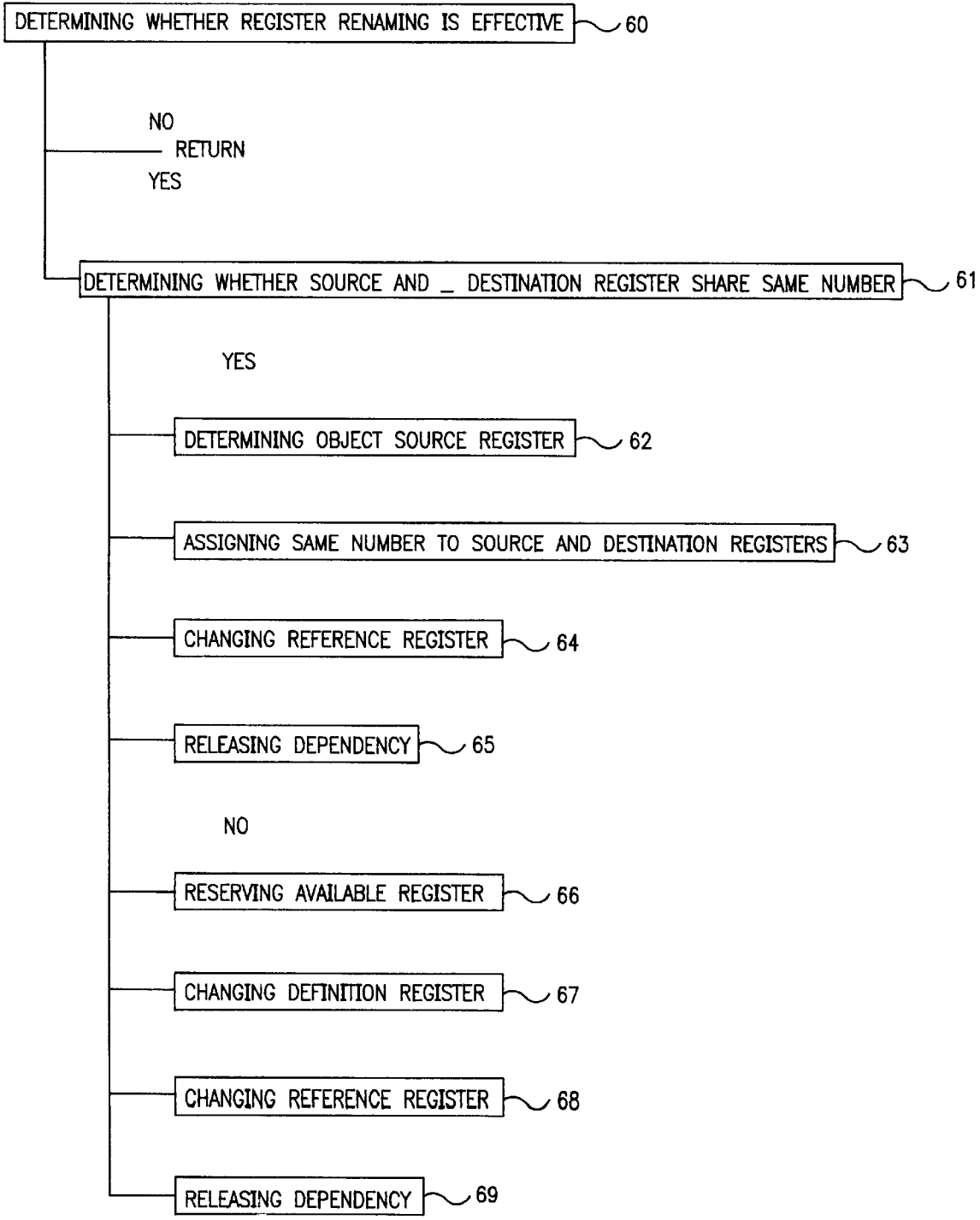
FIG. 16 is a flowchart of the processes performed by the register renaming unit according to the second embodiment shown in FIG. 15.

FIG. 15 shows the configuration of the instruction scheduling unit according to second embodiment of the present invention. The register renaming process is performed at the analysis of dependency of instructions in the first embodiment shown in FIG. 5. On the other hand, in the second embodiment shown in FIG. 15, it is performed after the analysis. The flow of the processes performed by the register renaming unit 19 in the second embodiment is shown in FIG. 16. Processes 60 through 64, and 66 through 68 shown in FIG. 16 are similar to processes 50 through 54 and 55 through 57 shown in FIG. 8, respectively. The dependency can be changed by deleting the relation (processes 65 and 69 shown in FIG. 16) from the procedure in the register renaming process. The deletion of the dependency is equivalent to the deletion of elements from the list structure.

Registers are renamed when the instruction dependency analyzing unit 18 operates according to the first embodiment shown in FIG. 5. Therefore, this second embodiment has the merit of easy implementation. According to the second embodiment shown in FIG. 15, registers are renamed after the process of the instruction dependency analyzing unit 18, and require deletion of dependency. However, it has the merit of assigning priority levels by renaming the registers according to the dependency in case, for example, registers are likely to become short.

Figure 17:
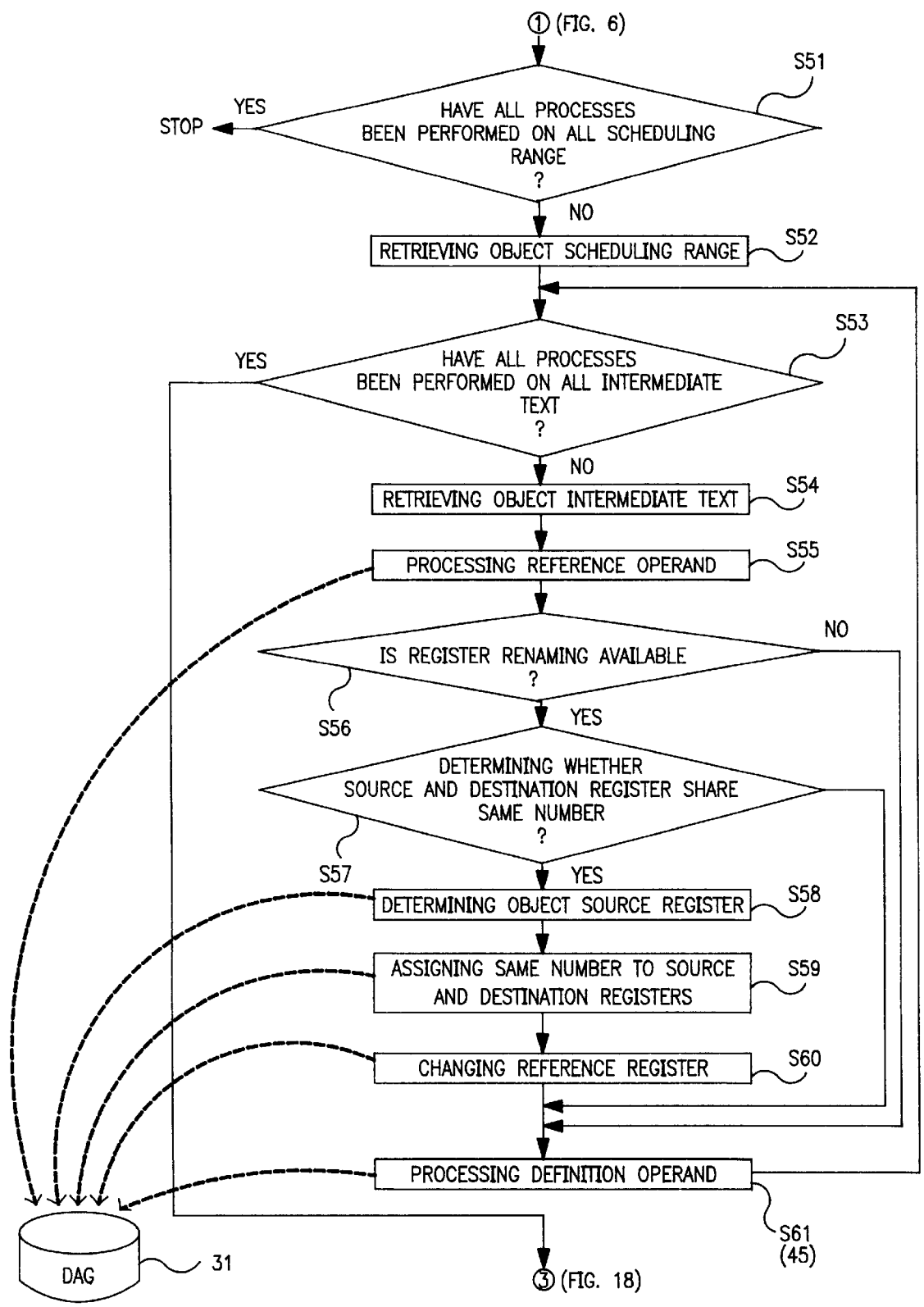
FIG. 17 is a general flowchart showing the process according to the second embodiment.
Figure 18:
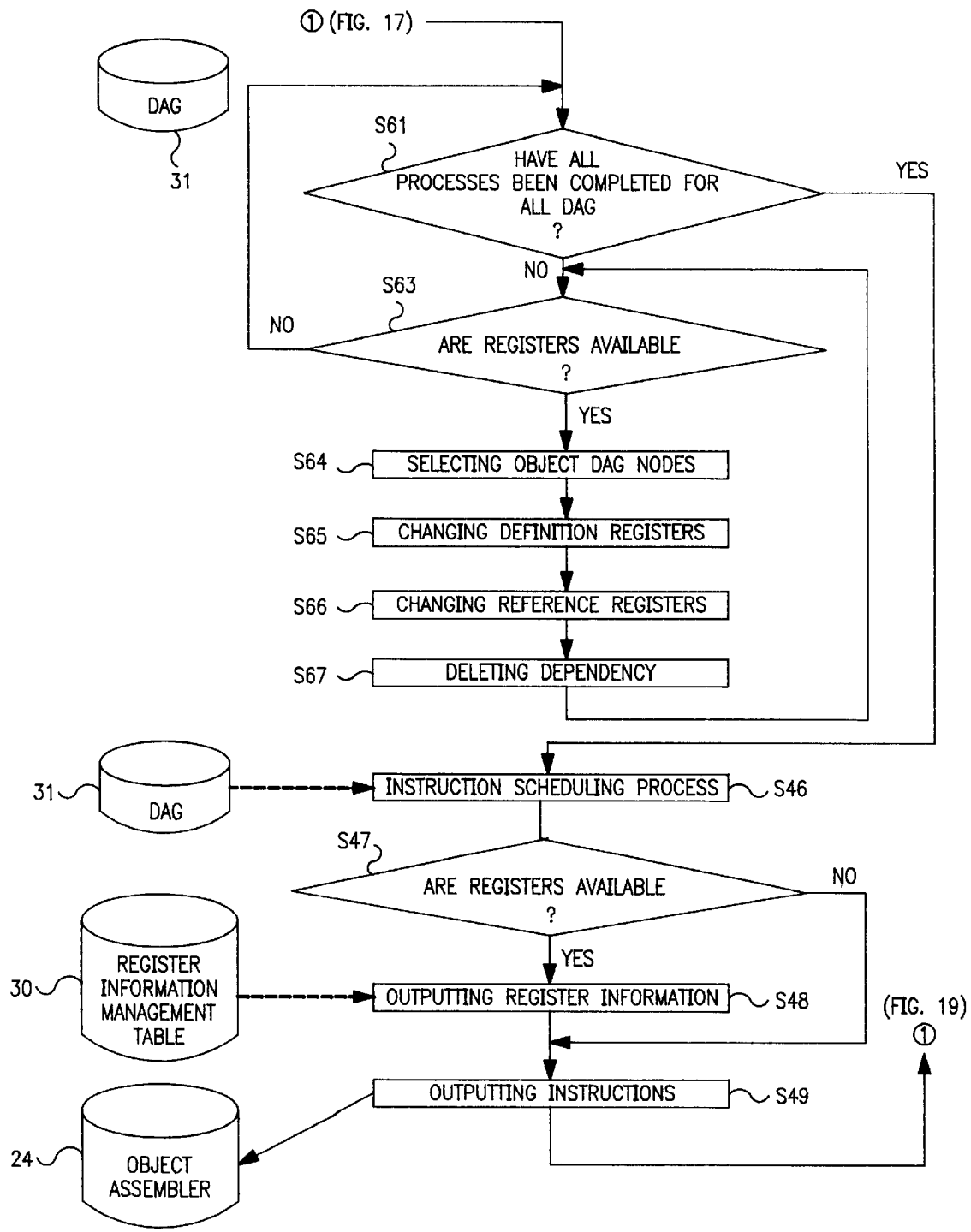
FIG. 18 is a general flowchart (continued) showing the process according to the second embodiment.

FIGS. 17 and 18 show the summary of the processes according the second embodiment described by referring to FIGS. 15 and 16. As in the first embodiment, the processes are performed after the register information collecting process. As compared with FIGS. 15 and 16, the dependency deletion step is not shown after the reference register change process in FIGS. 17 and 18. Since the dependency remains unchanged even if the two register numbers are made to match each other, the dependency deletion step is omitted in these figures.

However, the dependency deletion process 69 shown in FIG. 16 is required. Without this process, processes are performed as if the dependency remains existing among the intermediate texts as a result of the register renaming process in subsequent scheduling instructions.

The definition operand process in step S61 corresponds to the definition operand process 43 shown in FIG. 7. FIGS. 17 and 18 also correspond to FIG. 7.

If it is determined that the process has been performed on all intermediate texts in step S53 shown in FIG. 17, then it is determined in step S62 whether or not the processes in steps S63 through S67 have been completed for all DAG nodes. If not, performed in steps S63 through S67 are the processes in steps S66 through S69 adopted when the source and destination registers cannot share the same number.

If it is determined that the process has been completed for all DAG nodes in step 62, then performed are the processes in steps S46 through S49, that is, from the instruction scheduling process to the instruction code outputting process as shown in FIG. 12. Then, control returns to step S51 and the compiling process terminates when it is determined that the processes have been completed for all scheduling ranges.

FIGS. 19A through 19C shows the register renaming process performed depending on computer architecture.

In the register renaming process through the register renaming unit 19, the renaming priority levels are changed depending on computer architecture using the architecture information table 21. A practical example is described below.

Assume that there are two different architectures A and B as computers to be compiled.

Architecture A is an independent (operated in parallel) operating unit comprising the following units.

Memory Operating Unit 1

Integer Operating Unit 1

Floating Point Operating Unit 1

Architecture B is an independent operating unit comprising the following units.

Memory Operating Unit 1

Integer Operating Unit 1

Floating Point Adder 1

Floating Point Multiplier/Divider 1

The operating unit information section on the architecture information table 21 of architecture A stores the number of an operating unit used for each instruction as shown in FIG. 19A. The number of an operating unit is preliminarily defined as shown in FIG. 19C. For example, 0 for no use of operating units ($UNIT_{13}NONE$); 1 for a memory operating unit ($UNIT_{13}MEM$); and 2 for integer operating unit ($UNIT_{13}INT$). Architecture A uses a floating point operating unit (UNIT_FLOAT) for all floating point add instructions (fadd), floating point subtract instructions (fsub), and floating point multiply instructions (fmul).

The architecture information table 21 of architecture E1 stores operating unit information as shown in FIG. 19B which defines that a floating point addition/subtraction operating unit ($UNIT_{13}FADD$) is used for floating point add instructions (fadd) and floating point subtract instructions (fsub), and that a floating point multiplication/division operating unit (UNIT_FMUL) is used for floating point multiply instructions (fmul).

If there are a plurality of renaming candidates in the register renaming process according to the second embodiment, then the following prioritization is performed using the architecture information table 21.

(1) When instructions are scheduled, the dependency among the instructions should be checked. An analysis graph (DAG) representing the independency among instructions normally indicates scheduling priority levels. These priority levels indicate the phases of instructions which use the execution result of an instruction. Assume that there is the following instruction string where A is an instruction to load the contents of memory X to register R1; B is an add instruction to set in register R3 the sum of the values in registers R1 and R2; and C is an add instruction to set in register R5 the sum of the values in registers R3 and R4.

A: LOAD R1, X

B: ADD R1, R2, R3

C: ADD R3, R4, R5

In this case, the dependency among the instructions is A←B←C where higher priority levels are assigned in the order of A, B, and C. They are renamed in this order.

(2) If the instructions are assigned the same priority level, then the operating units should be considered. The priority in register renaming should be determined such that operations are performed without bias. For example, there are the following operations to be renamed:

LOAD
FADD
FADD
FMUL

With the above mentioned architecture A, FADD and FMUL are processed by the same floating point operating unit and therefore no priority is considered for the instruction string through the operating unit. However, with architecture B, FADD and FMUL are processed by different operating units. Accordingly, the registers can be utilized more effectively by renaming FMUL with higher priority than FADD.

(3) If the same operating unit is used, an instruction having a longer latency is prioritized. If the operations take longer in the order of FMUL, FADD, and LOAD in the above listed instruction string, they are prioritized in renaming in the order of FMUL, FADD, and LOAD. The instruction latency is not indicated in FIG. 19, but is actually set in the architecture information table 21 as shown in FIG. 3. Therefore, the renaming priority can be determined using the architecture information table 21.

The register renaming process performed depending on the architecture and described above by referring to FIGS. 19A through 19C is actually performed according to the second embodiment only. A practical example of the register renaming process is described below. Described below as the first practical embodiment is the register renaming process performed on the following intermediate text strings depending on the architecture conditions. The eight available registers are f0-1, f2-3, f4-5, and f6-7. The floating point add instruction (FADD) and the floating point multiply instruction (FMULT) can be executed in parallel because the respective operating units are independent.

|      |       |           |
|------|-------|-----------|
| (1)  | LOAD  | A, f0     |
| (2)  | FMULT | f0, f2, f0 |
| (3)  | LOAD  | B, f4     |
| (4)  | FADD  | f0, f4, f0 |
| (5)  | STORE | f0, C     |
| (6)  | LOAD  | D, f4     |
| (7)  | LOAD  | E, f0     |
| (8)  | FMULT | f0, f2, f0 |
| (9)  | FADD  | f0, f4, f0 |
| (10) | STORE | f0, F     |

Figure 20:
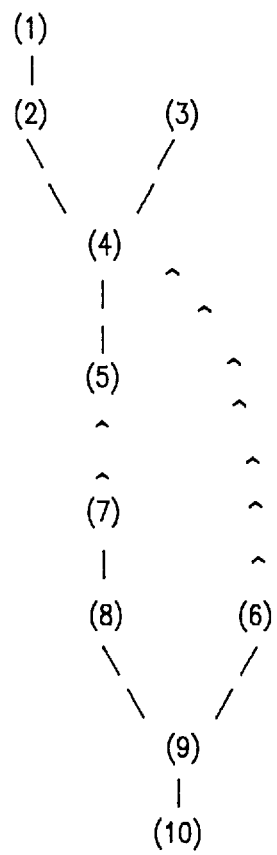
FIG. 20 shows a practical example (1) of the register renaming process performed depending on the architecture.

FIG. 20 is equivalent to a DAG showing the dependency among the instructions in the first practical example. The processes corresponding to FIG. 20 are shown below and the required process time is 23τ.

|   |       |           |
|---|-------|-----------|
| - | LOAD  | A, f0     |
| - | LOAD  | F, f4     |
| - | FMULT | f0, f2, f0 |
| - | nop   |           |
| - | nop   |           |
| - | nop   |           |
| - | FADD  | f0, f4, f0 |
| - | nop   |           |
| - | nop   |           |

-continued

|   |       |           |
|---|-------|-----------|
| - | nop   |           |
| - | STORE | f0, C     |
| - | LOAD  | D, f4     |
| - | LOAD  | E, f0     |
| - | nop   |           |
| - | FMULT | f0, f2, f0 |
| - | nop   |           |
| - | nop   |           |
| - | nop   |           |
| - | FADD  | f0, f4, f0 |
| - | nop   |           |
| - | nop   |           |
| - | nop   |           |
| - | STORE | f0, 7     |

If the register renaming process is performed in the order of appearance of intermediate text without considering the architecture conditions in the first embodiment, then the intermediate text 6 is selected as the intermediate text to be renamed. Thus, the intermediate text string and the processes result as follows. The process time is 22τ.

|      |       |           |
|------|-------|-----------|
| (1)  | LOAD  | A, f0     |
| (2)  | FMULT | f0, f2, f0 |
| (3)  | LOAD  | B, f4     |
| (4)  | FADO  | f0, f4, f0 |
| (5)  | STORE | f0, C     |
| (6)  | LOAD  | D, f6     |
| (7)  | LOAD  | E, f0     |
| (8)  | FMULT | f0, f2, f0 |
| (9)  | FADO  | f0, f6, f0 |
| (10) | STORE | f0, F     |
| -    | LOAD  | A, f0     |
| -    | LOAD  | B, f4     |
| -    | FMULT | f0, f2, f0 |
| -    | LOAD  | D, f6     |
| -    | nop   |           |
| -    | nop   |           |
| -    | nop   |           |
| -    | FADO  | f0, f4, f0 |
| -    | nop   |           |
| -    | nop   |           |
| -    | nop   |           |
| -    | STORE | f0, C     |
| -    | LOAD  | E, f0     |
| -    | nop   |           |
| -    | FMULT | f0, f2, f0 |

-continued

|      |       |           |
|------|-------|-----------|
|      | nop   |           |
|      | nop   |           |
|      | nop   |           |
|      | FADO  | f0, f4, f0 |
|      | nop   |           |
|      | nop   |           |
|      | nop   |           |
|      | STORE | f0, F     |

If the load instruction for the intermediate text 7 is selected by priority to be executed in the register renaming process, then the intermediate text string and the processes result as follows with the process time considerably shortened to 18τ by properly considering the architecture conditions.

| (1)  | LOAD  | A, f0     |
|------|-------|-----------|
| (2)  | FMULT | f0, f2, f0 |
| (3)  | LOAD  | B, f4     |
| (4)  | FADO  | f0, f4, f0 |
| (5)  | STORE | f0, C     |
| (6)  | LOAD  | D, f4     |
| (7)  | LOAD  | E, f6     |
| (8)  | FMULT | f6, f2, f6 |
| (9)  | FADO  | f6, f4, f6 |
| (10) | STORE | f0, F     |

|       |           |
|-------|-----------|
| LOAD  | A, f0     |
| LOAD  | B, f4     |
| LOAD  | E, f4     |
| FMULT | f0, f2, f0 |
| nop   |           |
| FMULT | f6, f2, f6 |
| nop   |           |
| FADO  | f0, f4, f0 |
| nop   |           |
| nop   |           |
| nop   |           |
| STORE | f0, C     |
| LOAD  | D, f4     |
| nop   |           |
| FADO  | f6, f4, f6 |
| nop   |           |
| nop   |           |
| nop   |           |
| STORE | f0, F     |

Shown below is the intermediate text string for the second embodiment of the register renaming process performed in consideration of the architecture conditions.

| (1) | LOAD  | A, f0      |
|-----|-------|------------|
| (2) | FMULT | f0, f2, f0 |
| (3) | LOAD  | B, f4      |
| (4) | FADO  | f0, f4, f0 |
| (5) | STORE | f0, C      |
| (6) | LOAD  | D, f4      |
| (7) | FADO  | f2, f2, f0 |
| (8) | FMULT | f0, f4, f0 |
| (9) | STORE | f0, E      |

Figure 21:
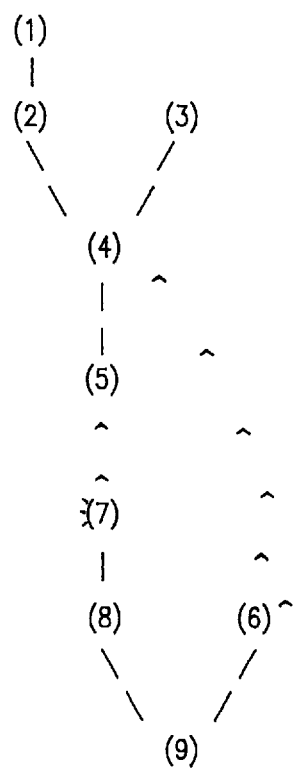
FIG. 21 shows a practical example (2) of the register renaming process performed depending on the architecture.

FIG. 21 is equivalent to a DAG showing the dependency among the instructions in the second practical example. The processes corresponding to FIG. 21 are shown below and the required process time is 20τ.

|       |            |
|-------|------------|
| LOAD  | A, f0      |
| LOAD  | B, f4      |
| FMULT | f0, f2, f0 |
| nop   |            |
| nop   |            |
| nop   |            |
| FADO  | f0, f4, f0 |
| nop   |            |
| nop   |            |
| STORE | f0, C      |
| LOAD  | D, f4      |
| FADO  | f2, f2, f0 |
| nop   |            |
| nop   |            |
| nop   |            |
| FMULT | f0, f4, f0 |
| nop   |            |
| nop   |            |
| nop   |            |
| STORE | f0, E      |

If the register renaming process is performed in the order of appearance of intermediate text without considering the architecture conditions in the second embodiment, then the intermediate text 6 is selected to be processed, and the destination register for the load instruction is changed into, for example, f6. However, the process time is not shortened at all, resulting in no effect of the register renaming process.

By contrast, if the intermediate text 7 is selected as an object of the register renaming process, then the intermediate text string and the processes result as follows with the entire process time shortened to 18τ by improving the parallelism.

| (1) | LOAD  | A, f0      |
|-----|-------|------------|
| (2) | FMULT | f0, f2, f0 |

-continued

| | | |
|---|---|---|
| (3) | LOAD | B, f4 |
| (4) | FADO | f0, f4, f0 |
| (5) | STORE | f0, C |
| (6) | LOAD | D, f0 |
| (7) | FADO | f2, f2, f6 |
| (8) | FMULT | f6, f4, f6 |
| (9) | STORE | f6, E |
| | LOAD | A, f0 |
| | FADO | f2, f2, f6 |
| | LOAD | B, f4 |
| | FMULT | f0, f2, f0 |
| | nop | |
| | nop | |
| | nop | |
| | FADO | f0, f4, f0 |
| | nop | |
| | nop | |
| | nop | |
| | LOAD | D, f4 |
| | nop | |
| | FMULT | f0, f4, f0 |
| | nop | |
| | nop | |
| | nop | |
| | STORE | f0, E |

Figure 22:
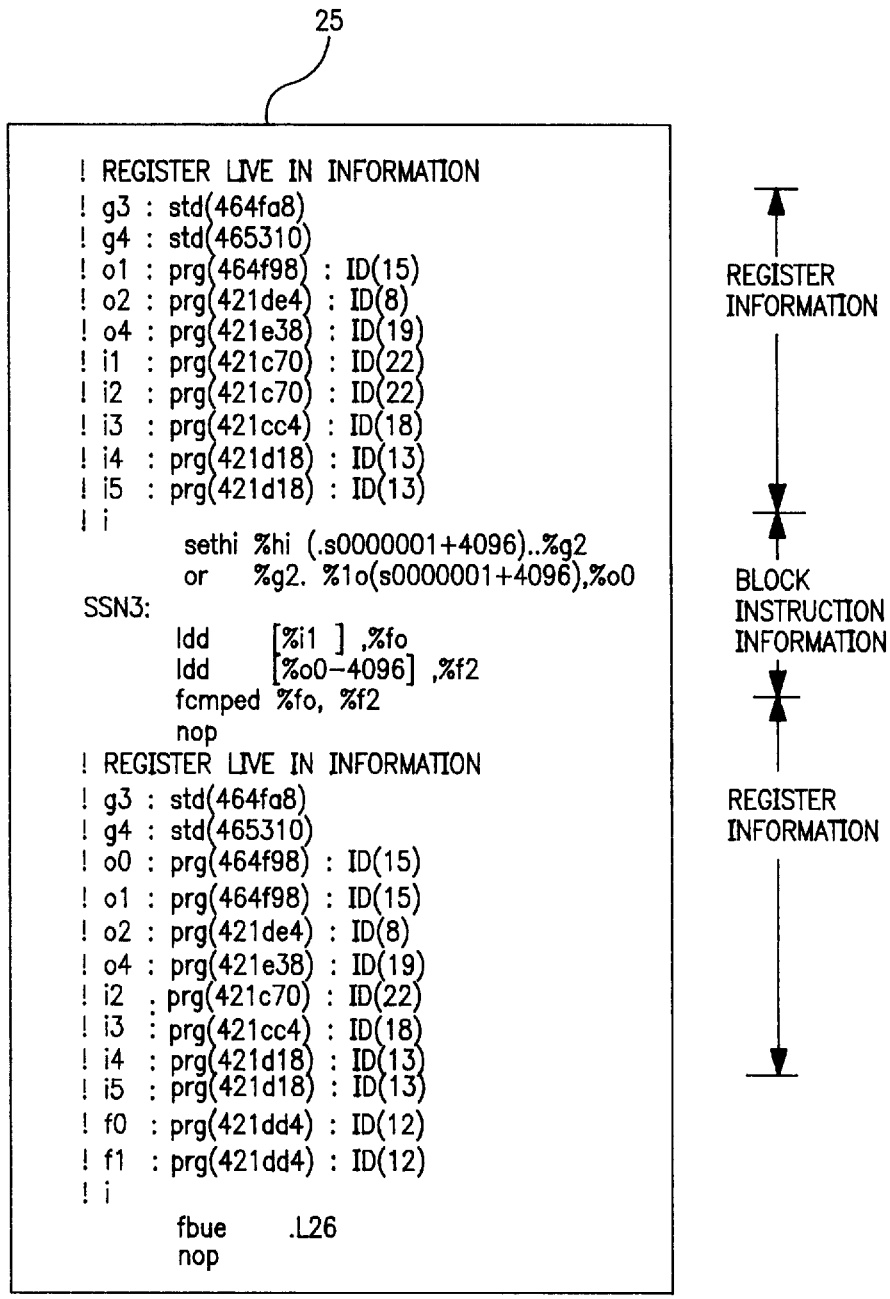
FIG. 22 shows an output example of the debug information according to the present invention.

FIG. 22 shows an output example of the debug information according to the present invention.

Useful debug information 25 can be obtained by outputting in the form of characters through the debug information output unit 23 the contents of the register information management table 30 collected by the register information collecting unit 17. In the debug information 25 shown in FIG. 22, the first register information indicates registers alive (LIVE IN) when the range of scheduling instructions from sethi instruction to nop instruction is entered and the data held by the alive registers. Alive in this example are registers g3, g4, o1, o2, o4, and i1 through i5. For example, g3:std (464fa8) indicates that register g3 corresponds to the temporary memory information at address 464fa8. Likewise, o1:prg (464f98):ID (15) indicates that register o1 corresponds to the temporary memory information at address 464f98 with the ID number 15 assigned to it.

Register information after block instruction information indicates registers alive (LIVE OUT) when the scheduling range is quit and the data held by the alive registers. Although registers f0 and f2 are defined in the schedule range, only register f0 is valid because register f2 is not directly referred to after the scheduling range is quit. Register f1 is represented also as valid because the architecture is defined to comprise registers f0 and f1 in a pair in this embodiment.

The above described embodiment of the present invention has the following features:

(1) A compiling unit comprises a front-end unit, an optimization unit, a register allotting unit, an instruction scheduling unit, and a code output unit. It compiles instructions after allotting registers and then scheduling the instructions. The instructions can be executed efficiently in parallel through a register renaming process performed when the instructions are scheduled.

(2) The instruction scheduling unit comprises a register information collecting unit and renames registers during or after the process performed by an instruction dependency analyzing unit.

(3) In the register renaming process, architecture information is referred to and the register renaming priority levels are reassigned, thereby allowing the optimum registers to be used depending on the architecture.

(4) The register information collected by the register information collecting unit is output as debug information, thereby obtaining useful debug information.

(5) The register renaming unit improves parallelism and reduces the number of registers to be used. Therefore, the registers can be effectively used.

(6) The register renaming unit reuses registers to be used, thereby efficiently utilizing the registers.

As described above, the compiler separately sets the register allotting phase from the instruction scheduling phase according to the present invention to realize parallel processes of instructions and solve the problems about system performance by appropriately setting the order of a register allotting process and an instruction scheduling process. Thus, in the register allotting phase, it is not necessary to consider the parallelism of instructions, and the phase retains its independency. Furthermore, the instructions can be scheduled for efficient parallel processes independently of allotting registers.

What is claimed is:

1. A compiling apparatus for scheduling instructions by rearranging the instructions after allotting registers to object data for each of the instructions in a program, comprising:

register information collecting means for collecting availability register information of the registers after once allotting the availability register information in a scheduling range in which the instructions are rearranged;

instruction dependency analyzing means for analyzing dependency relating to definition of and reference to the registers among the object data for the instructions in the program;

register renaming means for replacing at least one of the registers after once being allotted to the object data in the instructions based on intermediate text with at least one of the other registers according to an output of said register information collecting means and an output of said instruction dependency analyzing means; and an instruction schedule process unit for scheduling said instructions based on the at least one of the other registers generated by said register renaming means.

2. The compiling apparatus according to claim 1, further comprising:

register information storage means for storing the register information collected by said register information collecting means;

wherein said register information storage means stores, for each of a plurality of scheduling ranges in the program, information about a register not required in the scheduling range, a register used in the scheduling range, a register entered as an alive register in the scheduling range, and a register exiting as the alive register from the scheduling range.

3. The compiling apparatus according to claim 1, further comprising:

register information storage means for storing the register information generated by said register renaming means; and debug information output means for outputting the register information which is collected by said register information collecting means and stored in said register information storage means, in the form of characters as debug information.

4. The compiling apparatus according to claim 1, wherein:

said register renaming means renames the registers for improving parallelism of processes by replacing the registers allotted to the object data with other registers; and said register renaming means renames the registers for reducing a number of the registers by using, in a single instruction; a source register which stores reference data also as a destination register which stores data obtained as a result of execution of the instruction.

5. The compiling apparatus according to claim 4, wherein said register renaming means sequentially retrieves the instructions in the scheduling range one by one in an execution order, determines whether the source register can also be used as the destination register in a retrieved instruction, and if the source register can also be used as the destination register in the retrieved instruction, assigns a same number as the destination register to the source register, and if the source register cannot also be used as the destination register in the retrieved function, sequentially determines whether a register renaming process which improves the parallelism of the processes is valid, and if the register renaming process is valid, replaces the register allotted to the object data with the other register.

6. The compiling apparatus according to claim 5, wherein said register renaming means determines whether the register renaming process is valid for a first retrieved instruction, and retrieves a next instruction in the execution order without renaming the registers for the first retrieved instruction if the register renaming process is invalid.

7. The compiling apparatus according to claim 5, wherein said register renaming means determines that the source register can also be used as the destination register based upon a first condition, a second condition, and a third condition existing, said first condition requiring that contents of the destination register defined in the instruction to be determined are referred to at least once in subsequent instructions within the scheduling range to which the instruction belongs, said second condition requiring that contents of the source register in the instruction to be determined are not referred to in the subsequent instructions, and said third condition requiring that contents of the destination register in the instruction to be determined are not referred to in any program after the scheduling range to which the instruction belongs.

8. The compiling apparatus according to claim 5, wherein said register renaming means stores a last reference position of the register in the instruction replaced in the register renaming process, and allows the register to be reused as an available register candidate if the instruction to be processed in the register renaming process after the instruction in which the register was replaced appears after the last reference position.

9. The compiling apparatus according to claim 4, wherein said register renaming means determines whether the source register is also usable as the destination register in each of entire instructions in one scheduling range, performs the register renaming process according to a determination result such that the source register is also usable as the destination register, and then performs the register renaming process in which the registers allotted to the object data are replaced with other registers for the entire instructions in the scheduling range.

10. The compiling apparatus according to claim 9, wherein said register renaming means determines that the source register can also be used as the destination register based upon a first condition, a second condition, and a third condition existing, said first condition requiring that contents of the destination register defined in the instruction to be determined are referred to at least once in subsequent instructions within the scheduling range to which the instruction belongs, said second condition requiring that contents of the source register in the instruction to be determined are not referred to in the subsequent instructions, said third condition requiring that contents of the destination register in the instruction to be determined are not referred to in any program after the scheduling range to which the instruction belongs.

11. The compiling apparatus according to claim 9, further comprising:

architecture information storage means for storing architecture information of a computer in which the program to be compiled operates;

wherein said register renaming means alters register renaming priority levels among a plurality of instructions for transferring one of the registers to one of the other registers based upon the intermediate text depending on the architecture information of the computer.

12. A compiling apparatus which schedules instructions after allotting registers to generate codes for an efficient parallel process of the instructions, said apparatus having a front-end unit for receiving and analyzing a source program, an optimization unit for optimizing an analysis result, a register allotting unit for allotting the registers to data to be processed as the analysis result, an instruction scheduling unit for rearranging the instructions, and a code output unit for outputting an object program, the instruction scheduling unit comprising:

a register information collecting unit for collecting register information indicating a range of available registers;

instruction dependency analyzing means for analyzing dependency of the instructions in definition and reference;

register renaming means for renaming the registers by replacing register numbers used for the instructions with other register numbers according to the collected register information and the instruction dependency analysis result; and instruction schedule process means for rearranging the instructions according to the renaming of the registers.

13. A compiling method for scheduling instructions by rearranging the instructions after allotting registers to object data for each of the instructions in a program, comprising the steps of:

collecting availability information of the registers in a scheduling range in which the instructions are rearranged;

analyzing dependency relating to definition of and reference to the registers among the instructions in the program;

replacing at least one of the registers allotted to the object data in the instructions with at least one of the other registers according to an output of said register information collecting step and an output of said instruction dependency analyzing step; and scheduling said instructions based on a result generated by said register renaming step.

* * * * *